United States Patent
Setogawa et al.

(12) 
(10) Patent No.: US 6,246,402 B1
(45) Date of Patent: Jun. 12, 2001

(54) REPRODUCTION CONTROL DATA GENERATING APPARATUS AND METHOD OF SAME

(75) Inventors: Toshiaki Setogawa; Masao Sasaki; Ayato Nakagawa, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/550,475

(22) Filed: Apr. 14, 2000

Related U.S. Application Data

(62) Division of application No. 08/964,739, filed on Nov. 5, 1997.

(30) Foreign Application Priority Data

Nov. 7, 1996 (JP) .................................................... 8-295206
Nov. 7, 1996 (JP) .................................................... 8-295207

(51) Int. Cl.[7] .............................. G06F 3/00; G11B 27/02
(52) U.S. Cl. ..................... 345/328; 3453/302; 3453/357; 386/55; 386/124
(58) Field of Search ................................... 345/328, 327, 345/302, 357, 356, 352, 353, 333, 335; 707/501; 386/55, 52, 83, 35, 40, 97, 124, 125; 348/700

(56) References Cited

U.S. PATENT DOCUMENTS

| | | |
|---|---|---|
| 4,422,105 | 12/1983 | Rodesch et al. ........................ 386/83 |
| 5,101,364 | 3/1992 | Davenport et al. .................. 345/328 |
| 5,161,034 * | 11/1992 | Klappert ............................. 386/40 X |
| 5,428,731 | 6/1995 | Powers, III .......................... 707/501 |
| 5,659,793 * | 8/1997 | Escobar et al. ...................... 345/302 |
| 5,708,767 * | 1/1998 | Yeo et al. ......................... 345/302 X |
| 5,737,527 | 4/1998 | Shiels et al. ..................... 345/302 X |
| 5,801,687 * | 9/1998 | Peterson et al. ..................... 345/302 |
| 5,861,881 | 1/1999 | Freeman et al. ..................... 345/302 |
| 5,894,333 * | 4/1999 | Kanda et al. .................... 348/700 X |
| 5,966,121 | 10/1999 | Hubbell et al. ...................... 345/328 |

* cited by examiner

*Primary Examiner*—Raymond J. Bayerl
(74) *Attorney, Agent, or Firm*—Frommer Lawrence & Haug, LLP.; William S. Frommer; Darren M. Simon

(57) ABSTRACT

A reproduction control data generating apparatus for generating reproduction control data containing control commands indicating a method of reproduction of audio and/or video data and menu screen data indicating a menu screen used for designation of a control command at the time of reproduction of the audio and/or video data, comprising an input operation screen displaying means for displaying an input operation screen used for the input operation of a control command and the menu screen data, a control command generating means for generating a control command in accordance with an operation with respect to the displayed input operation screen, a menu screen data generating means for generating menu screen data in accordance with an operation with respect to the displayed input operation screen, and a reproduction control data generating means for generating reproduction control data based on the generated control command and the menu screen data.

6 Claims, 31 Drawing Sheets

| REPRODUCTION GROUP | REPRODUCTION UNIT | DESTINATION OF TRANSITION |
|---|---|---|
| TITLE SELECTION | TITLE MENU | 1. REPRODUCTION UNIT "TITLE 1" OF REPRODUCTION GROUP "TITLE REPRODUCTION"<br>2. REPRODUCTION UNIT "TITLE 2" OF REPRODUCTION GROUP "TITLE REPRODUCTION"<br>3. REPRODUCTION GROUP "AUDIO SELECTION" |
| AUDIO SELECTION | EACH AUDIO MENU | 1. REPRODUCTION UNIT "TITLE 1" OF REPRODUCTION GROUP "TITLE REPRODUCTION"<br>2. REPRODUCTION UNIT "TITLE 2" OF REPRODUCTION GROUP "TITLE REPRODUCTION" |

| REGION | REPRODUCTION UNIT | DESTINATION OF TRANSITION |
|---|---|---|
| TITLE SELECTION | TITLE MENU | 3. REGION "AUDIO SELECTION" |
| AUDIO SELECTION | AUDIO MENU 1 | 1. REPRODUCTION UNIT "TITLE 1" OF REGION "TITLE REPRODUCTION" |
| | AUDIO MENU 2 | 2. REPRODUCTION UNIT "TITLE 2" OF REGION "TITLE REPRODUCTION" |

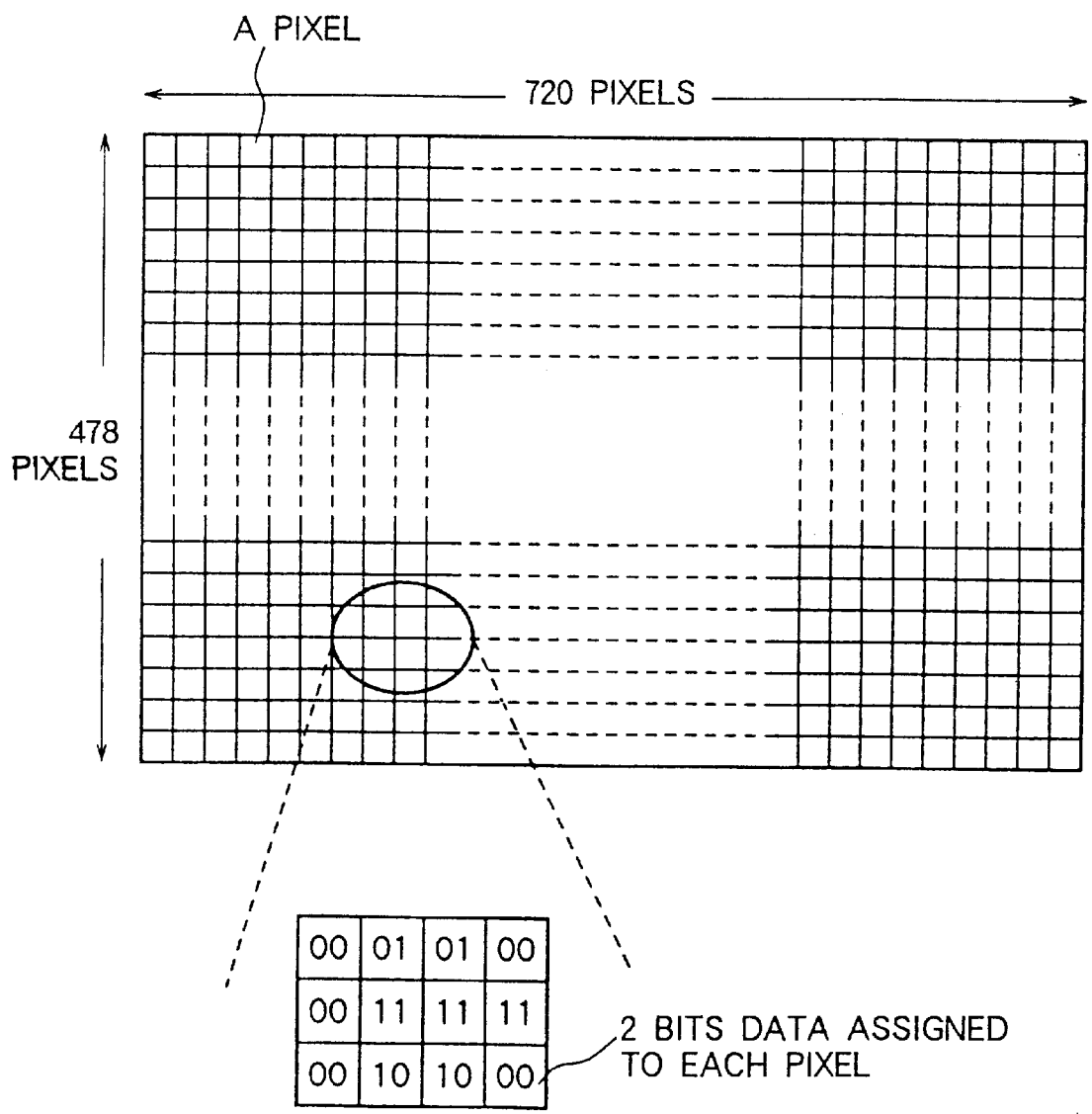

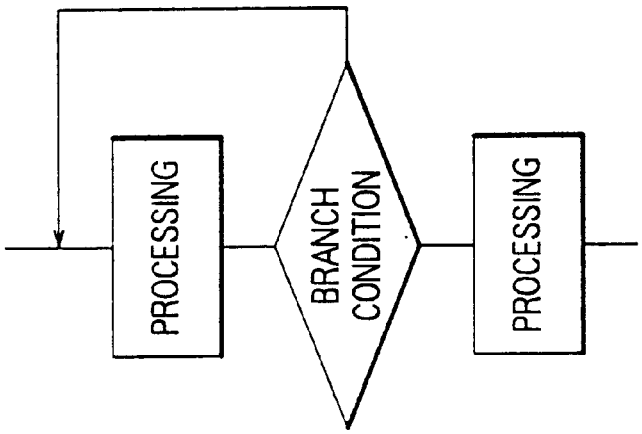
FIG. 16C CONTINUOUS AND BRANCH REPRODUCTION
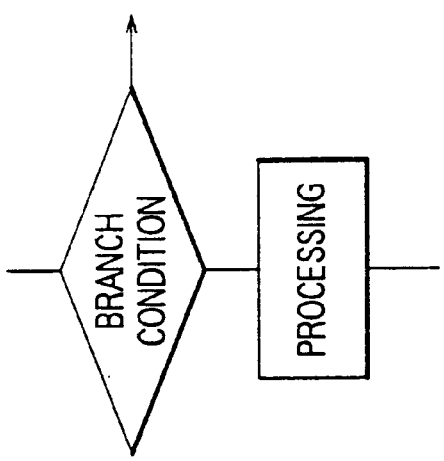
FIG. 16B BRANCH REPRODUCTION
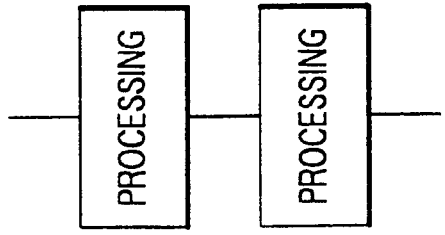
FIG. 16A CONTINUOUS REPRODUCTION

FIG. 20

| REPRODUCTION GROUP | REPRODUCTION UNIT |
|---|---|
| TITLE SELECTION | 1. TITLE MENU |
| AUDIO SELECTION | 1. AUDIO MENU 1 FOR TITLE 1<br>2. AUDIO MENU 2 FOR TITLE 2 |
| TITLE REPRODUCTION | 1. TITLE 1<br>2. TITLE 2 |

FIG. 21A

SYSTEM VARIABLES

| | |
|---|---|
| 0 | — |
| 1 | AUDIO STREAM NUMBER |
| 2 | — |
| 3 | — |
| 4 | TITLE NUMBER |
| ⋮ | ⋮ |

FIG. 21B

REGISTER

| | |
|---|---|
| 0 | |
| 1 | |
| 2 | |
| ⋮ | ⋮ |

FIG. 22

| REGION | OPERATION |
|---|---|
| TITLE MENU | 1. OUTPUT SCREEN FOR TITLE SELECTION FROM REPRODUCTION MACHINE.<br>2. STORE TITLE NUMBER OBTAINED AS RESULT OF SELECTION OPERATION OF USER AT ADDRESS NO. 4 OF SYSTEM REGISTER. |
| AUDIO MENU | 1. OUTPUT SCREEN FOR AUDIO SELECTION FOR EVERY TITLE FROM REPRODUCTION MACHINE.<br>2. STORE AUDIO STREAM NUMBER OBTAINED AS RESULT OF SELECTION OPERATION OF USER AT ADDRESS NO. 1 OF SYSTEM REGISTER. |
| TITLE REPRODUCTION | 1. CAN HAVE UP TO 99 TITLES.<br>2. SELECT AUDIO CORRESPONDING TO AUDIO STREAM NUMBER STORED AT ADDRESS NO. 1 OF SYSTEM REGISTER FOR EVERY TITLE AND CARRY OUT REPRODUCTION. |

FIG. 23

| REGION | OPERATION |
|---|---|
| WHOLE | • CANNOT COMPARE SYSTEM REGISTER AND DIRECT VALUE IN COMPARISON COMMAND.<br>EXAMPLE : CANNOT USE COMMAND SUCH AS IF VALUE OF SYSTEM REGISTER NO. 1 IS LARGER THAN "5". |
| TITLE MENU | • CAN TRANSIT TO "AUDIO MENU" OR "TITLE MENU". |
| AUDIO MENU | • CANNOT DIRECTLY JUMP TO MENU FOR EACH TITLE IN "AUDIO MENU" FROM OTHER REGION.<br>• CAN JUMP TO MENU FOR EACH TITLE IN ONLY "AUDIO MENU". |
| TITLE REPRODUCTION | • CAN DIRECTLY JUMP TO MENU FOR EACH TITLE IN "TITLE REPRODUCTION" FROM OTHER REGION. |

FIG. 24

| REPRODUCTION GROUP | REPRODUCTION UNIT | DESTINATION OF TRANSITION |
|---|---|---|
| TITLE SELECTION | TITLE MENU | 1. REPRODUCTION UNIT "TITLE 1" OF REPRODUCTION GROUP "TITLE REPRODUCTION"<br>2. REPRODUCTION UNIT "TITLE 2" OF REPRODUCTION GROUP "TITLE REPRODUCTION"<br>3. REPRODUCTION GROUP "AUDIO SELECTION" |
| AUDIO SELECTION | EACH AUDIO MENU | 1. REPRODUCTION UNIT "TITLE 1" OF REPRODUCTION GROUP "TITLE REPRODUCTION"<br>2. REPRODUCTION UNIT "TITLE 2" OF REPRODUCTION GROUP "TITLE REPRODUCTION" |

FIG. 25

| COMMAND UNIT | FUNCTION | COMMAND WORD |
|---|---|---|
| J1 | JUMP TO TITLE OF TITLE NUMBER 1 | JUMP TT 1 |
| J2 | JUMP TO TITLE OF TITLE NUMBER 2 | JUMP TT 2 |
| ... | ... | ... |
| J99 | JUMP TO TITLE OF TITLE NUMBER 99 | JUMP TT 99 |
| J100 | JUMP TO AUDIO MENU | JUMP AUDIO |

FIG. 26

| COMMAND UNIT | FUNCTION | COMMAND WORD |
|---|---|---|
| J1 | JUMP TO TITLE OF TITLE NUMBER 1 | JUMP TT 1 |
| J2 | JUMP TO TITLE OF TITLE NUMBER 2 | JUMP TT 2 |
| ... | ... | ... |
| J99 | JUMP TO TITLE OF TITLE NUMBER 99 | JUMP TT 99 |
| J100 | JUMP TO AUDIO MENU 1 | JUMP AUDIO MENU 1 |
| J101 | JUMP TO AUDIO MENU 2 | JUMP AUDIO MENU 2 |
| ... | ... | ... |
| J107 | JUMP TO AUDIO MENU 8 | JUMP AUDIO MENU 8 |
| F1 | STORE VALUE OF SYSTEM REGISTER AT ADDRESS NO. 0 OF GENERAL REGISTER | MOV SR4 GR0 |
| F2 | ERROR PROCESSING | EXIT |
| B1 | BRANCH TO ANY COMMAND IF VALUE OF ADDRESS NO. 0 OF GENERAL REGISTER IS 1, AND BRANCH TO NEXT COMMAND IN OTHER CASES | EQ GR0 1 |
| B2 | BRANCH TO ANY COMMAND IF VALUE OF ADDRESS NO. 0 OF GENERAL REGISTER IS 2, AND BRANCH TO NEXT COMMAND IN OTHER CASES | EQ GR0 2 |

FIG. 27

| REGION | REPRODUCTION UNIT | DESTINATION OF TRANSITION |
|---|---|---|
| TITLE SELECTION | TITLE MENU | 3. REGION "AUDIO SELECTION" |
| AUDIO SELECTION | AUDIO MENU 1 | 1. REPRODUCTION UNIT "TITLE 1" OF REGION "TITLE REPRODUCTION" |
| | AUDIO MENU 2 | 2. REPRODUCTION UNIT "TITLE 2" OF REGION "TITLE REPRODUCTION" |

NEXT STAGE OF REGION "TITLE SELECTION"

Jump Audio

PREVIOUS STAGE OF REGION "AUDIO SELECTION"

Mov SR4 GR0
EQ GR0 1 , Jump AM1
EQ GR0 2 , Jump AM2
Exit

NEXT STAGE OF REGION "AUDIO SELECTION"
REPRODUCTION UNIT "AUDIO MENU 1"

Jump TT1

LATTER STAGE OF REGION "AUDIO SELECTION"
REPRODUCTION UNIT "AUDIO MENU 1"

Jump TT2

REPRODUCTION CONTROL DATA GENERATING APPARATUS AND METHOD OF SAME

This is a divisional of application Ser. No. 08/964,739, filed Nov. 5, 1997.

BACKGROUND OF THE INVENTION

1. Field of the Invention

The present invention relates to a reproduction control data generating apparatus for generating control data (navigation commands) used for the control of the processing for reproduction of a moving picture recorded on a digital video disc (DVD) etc. and video data of a still picture (sub-picture) such as a menu which is recorded on the DVD together with the moving picture and used for the selection of the program to be reproduced and relates to a method of the same.

2. Description of the Related Art

A new recording medium referred to as a "digital video disc" (DVD) and a DVD recording and/or reproducing apparatus (hereinafter also referred to as a "DVD player") for recording audio data and video data or one of the same ("audio and/or video data") and reproducing the recorded audio and/or video data by using a DVD are now being put into practical use.

A DVD player can record and reproduce the audio and/or video data in special reproduction modes ("special modes") in addition to the same methods as conventional video tape recorders ("VTR apparatuses") (normal reproduction mode), for example, a method of selecting, reproducing, and displaying one of a plurality of series of audio and/or video data obtained by shooting the same object from a number of angles in accordance with the operation of the user (multi-angle reproduction mode), a method of selecting and reproducing one series of audio and/or video data of a main story of a movie in which a plurality of stories are recorded or a sub-story accompanied with the main story in accordance with the operation of the user (multi-story reproduction mode), and a method of selecting and reproducing from series of audio and/or video data prepared in advance to enable the user to select how a story plays out at every branching point of the story in a dialog format in accordance with the operation of the user (inter-active story reproduction mode).

In order to realize these special reproduction modes, it is necessary to program the order, timing, etc. of reproduction of the audio and/or video data using control commands referred to as navigation commands at the editing stage. Further, it is also necessary to prepare the still pictures (sub-pictures) used for displaying the menu screen, for use by the user for the selection etc. of the audio and/or video data, superimposed on the moving picture (main picture).

There are, however, many types of navigation commands, i.e., about 1,400 at the present point of time. It is very difficult for a general editor, who will not necessarily be skilled in programming work, to learn the meanings of all navigation commands and use them to their fullest extent.

Further, the meanings and number of icons displayed in each sub-picture must be changed in accordance with the nature of the operation, and the icons must be arranged in a manner easy for the user to see. Accordingly, when there are a large number of sub-pictures required in a special reproduction mode, a great deal of time and trouble are taken for the preparation of the sub-pictures.

SUMMARY OF THE INVENTION

The present invention was made in consideration with these disadvantages and has as an object thereof to provide a reproduction control data generating apparatus enabling a general editor who is not skilled in programming work to easily program the order, timing, etc. of the reproduction of audio and/or video data by navigation commands for use in a special reproduction mode of a DVD player and to provide a method of the same.

Another object of the present invention is to provide a reproduction control data generating apparatus enabling easy preparation of the sub-pictures used in the special reproduction modes of a DVD player and to provide a method of the same.

Still another object of the present invention is to provide a reproduction control data generating apparatus capable of greatly reducing the trouble and time required for the preparation of a large number of sub-pictures with different display contents and to provide a method of the same.

To attain the above objects, according to a first aspect of the present invention, there is provided a reproduction control data generating apparatus for generating reproduction control data containing control commands indicating a method of reproduction of audio and/or video data and menu screen data indicating a menu screen used for designation of a control command at the time of reproduction of the audio and/or video data comprising an input operation screen displaying means for displaying an input operation screen used for the operation of input of a control command and the menu screen data, a control command generating means for generating a control command in accordance with an operation with respect to the displayed input operation screen, a menu screen data generating means for generating menu screen data in accordance with an operation with respect to the displayed input operation screen, and a reproduction control data generating means for generating reproduction control data based on the generated control command and the menu screen data.

Preferably, the input operation screen displaying means displays control element command input graphics indicating control element commands comprising a control command on the input operation screen, and the reproduction control data generating means generates a control element command in accordance with an operation with respect to the control element command input graphics.

Preferably, the menu screen contains operation buttons corresponding to the control element commands, and the reproduction control data generating means lists the operation buttons and the control element commands at predetermined positions of the reproduction control data in correspondence in accordance with an operation with respect to the control element command input graphics.

Preferably, a control command contains at least, as the control element commands, pre-command data to be executed first at the time of execution of the control command in accordance with an operation with respect to an operation button of the menu screen, a button command to be executed in accordance with an operation with respect to an operation button of the menu screen, and post-command data to be executed last at the time of execution of the control command.

Preferably, the input operation screen displaying means displays menu screen element data input graphics indicating the menu screen element data comprising the menu screen data on the input operation screen, and the reproduction control data generating means generates the menu screen element data in accordance with an operation with respect to the menu screen element data input graphics.

Preferably, the menu screen contains operation buttons corresponding to the menu screen element data, and the reproduction control data generating means lists the operation buttons and the menu screen element data at predetermined positions of the reproduction control data in correspondence in accordance with an operation with respect to the menu screen element data input graphics.

Preferably, the menu screen data contains at least, as the menu screen element data, pixel data of a still picture of the menu screen, button position data indicating the position of each of the operation buttons and a relative positional relationship, and operation button color data indicating a color where an operation with respect to an operation button is not carried out, a color where an operation with respect to an operation button is carried out, and a color where a control command corresponding to an operation button is executed.

The reproduction control data generating apparatus according to the present invention is used when reproducing for example audio and/or video data such as a movie on a DVD capable of carrying out special reproduction, for example, audio and/or video data edited so that a user can select any reproduction start position, any language of audio output, and any camera angle by carrying out an operation on the menu screen. It generates the control commands (navigation commands) indicating the method of reproduction of the audio and/or video data and the pixel data (sub-picture data) of the menu screen used for the designation of the navigation commands by the user.

The input operation screen displaying means displays an input operation screen (GUI screen) used by the user for the operation for inputting the navigation commands and menu screen data in a dialog format (inter-actively).

On the menu screen, one or more operation buttons indicating commands which can be designated at the time of reproduction are displayed.

Further, a navigation command contains for example pre-command data to be executed first at the time of execution of the command, a button command corresponding to an operation button of the menu screen, and post-command data to be executed last.

Further, the menu screen data contains, for example, the pixel data of the still picture of the menu screen, button position data indicating the positions of the operation buttons and relative positional relationship, and operation button color data indicating colors (highlight colors) at the time of nonselection, time of selection, and case where the corresponding command is executed.

On the GUI screen, control element command input graphics (icons) indicating navigation commands and icons indicating the data of operation buttons etc. comprising the menu screen data (menu screen element data) are displayed. The user designates the data of the navigation commands and the menu screen data by moving a cursor to each icon by a remote controller etc. of the DVD player.

The input operation screen displaying means determines the data of the navigation commands and operation buttons corresponding to the icons designated by the user, stores the operation buttons and navigation commands in a predetermined data structure in correspondence, and generates the reproduction control data.

According to a second aspect of the present invention, there is provided a reproduction control data generating method for generating reproduction control data containing control commands indicating the method of reproduction of audio and/or video data and menu screen data indicating a menu screen used for designation of a control command at the time of reproduction of the audio and/or video data, comprising the steps of displaying an input operation screen used for the operation for input of a control command and menu screen data, generating a control command in accordance with an operation with respect to the displayed input operation screen, generating menu screen data in accordance with an operation with respect to the displayed input operation screen, and generating reproduction control data based on the generated control command and the menu screen data.

According to a third aspect of the present invention, there is provided a reproduction control data generating apparatus for generating reproduction control data indicating a method of reproduction of audio and/or video data comprising an audio and/or video data dividing means for dividing the audio and/or video data into reproduction units which serve as units of reproduction, a status transition extracting means for extracting a status transition among the divided reproduction units, a status transition selecting means for selecting a desired status transition from among the extracted status transitions, and a reproduction control data generating means for generating reproduction control data based on the selected status transition.

Preferably, the audio and/or video data dividing means groups the divided reproduction units into reproduction groups for every attribute, and the status transition extracting means extracts the status transition between the divided reproduction units and the grouped reproduction groups.

Preferably, the reproduction control data generating means comprises a control command generating means for generating a control command corresponding to the status transition processing for producing the extracted status transition and a control command selecting means for selecting a control command corresponding to the selected status transition, and generates reproduction control data containing the selected control command.

This aspect of the present invention enables the preparation of reproduction control data comprised of control commands (navigation commands) used for controlling the order of reproduction of the audio and/or video data for special reproduction of a DVD video disc or the language etc. of the audio by a dialog format (inter-actively) without the editor (user) editing the audio and/or video data to be recorded on the DVD having to directly handle the navigation commands.

The audio and/or video data dividing means divides the audio and/or video data recorded on the DVD into reproduction units which serve as units at the time of reproduction, that is, for example, into individual titles of a plurality of movies etc. recorded on the DVD, into individual ranges of the audio and/or video data to be reproduced in the audio and/or video data of an inter-active story reproduction mode in accordance with a selection operation, and into individual dubbed audio of a large number of languages, and groups the reproduction units having same attributes to prepare reproduction groups.

The status transition extracting means extracts a status transition indicating, for example, whether a certain reproduction unit or reproduction group (status) can be reproduced after other reproduction units or reproduction groups and whether other reproduction units or reproduction groups (status) can be reproduced after this reproduction unit or reproduction group (status) and displays the same to the user.

The status transition selecting means selects only the status transition desired by the user from among all status transitions extracted by the status transition extracting means in accordance with the operation of the user.

The reproduction control data generating means generates the navigation commands which become necessary for producing all status transitions extracted by the status transition extracting means in advance and generates the reproduction control data containing only the navigation commands corresponding to the status transition selected by the status transition selecting means.

According to a fourth aspect of the present invnetion, there is provided a reproduction control data generating method for generating reproduction control data indicating the method of reproduction of audio and/or video data, comprising the steps of dividing the audio and/or video data into reproduction units which serve as units of the reproduction, extracting a status transition among the divided reproduction units, selecting a desired status transition from among the extracted status transitions, and generating reproduction control data based on the selected status transition.

Preferably, the divided reproduction units are grouped into reproduction groups according to attribute, and the status transitions between the divided reproduction units and the grouped reproduction groups are extracted.

Preferably, the control commands corresponding to the status transition processing for producing the extracted status transition are generated, the control commands corresponding to the selected status transition are selected, and the reproduction control data containing the selected control commands is generated.

BRIEF DESCRIPTION OF THE DRAWINGS

These and other objects and features of the present invention will become clearer from the following description of the preferred embodiments given with reference to the attached drawings, wherein:

FIG. 1 is a view of a sub-picture defined in a DVD video disc standard;

FIGS. 16A to 16C are views of the reproduction processing of the inter-active software;

FIG. 20 is a table indicating the reproduction units and reproduction groups (reproduction regions) contained in the multi-title multi-audio software shown in FIGS. 19A to 19C;

FIG. 21A is a view of a system register for storing set values of a DVD player;

FIG. 21B is a view of a general register;

FIG. 22 is a view of examples of the operations of a DVD player for reproducing the multi-title multi-audio software corresponding to the menu screens shown in FIGS. 19A to 19C;

FIG. 23 is a view of examples of the operations of the DVD player for reproducing the multi-title multi-audio software corresponding to the menu screens shown in FIGS. 19A to 19C;

FIG. 24 is a view of examples of the status transitions of the DVD player for reproducing the multi-title multi-audio software corresponding to the menu screens shown in FIGS. 19A and 19B:

FIG. 25 is a first view indicating command units corresponding to the status transitions of a reproduction group "Title Selection" shown in FIG. 24;

FIG. 26 is a second view indicating command units corresponding to the status transitions of a reproduction group "Audio Selection" shown in FIG. 24;

FIG. 27 is a view of examples of the status transitions (FIG. 24) selected by the user;

DESCRIPTION OF THE PREFERRED EMBODIMENTS

First Embodiment

Below, as a first embodiment, an explanation will be made of for example a digital video disc (DVD) recording apparatus for recording video data of a moving picture such as a movie edited so as to be suitable for the special reproduction mode (hereinafter, also provisionally referred to as a "main picture") and audio data and one of the same (audio and/or video data) together with images such as menu screens indicating the content of operations to the user or subtitles (hereinafter also provisionally referred to as "sub-pictures") on a DVD.

Explanation of Sub-Picture

First, an explanation will be made of a sub-picture as defined in the DVD video disc standard (DVD format).

The DVD video disc standard defines the format of a still picture (sub-picture) displayed superimposed on a main picture separate from the compressed video data (main picture) of a moving picture compressed and encoded by the MPEG (Moving Picture Experts Group) 2.

FIG. 1 is a view of a sub-picture defined in the DVD video disc standard.

In the DVD video disc standard, as shown in FIG. 1, a sub-picture is defined as 2 bits of pixel data inherently assigned to each of the pixels obtained by dividing a picture (frame) into lateral 720×vertical 478 pieces (case of NTSC video system). That is, a sub-picture is defined in the form of a bit map corresponding to the pixels of a picture.

The values (0 to 3 (decimal)) of the 2 bits of pixel data assigned to each of the pixels respectively correspond to inherent colors. Accordingly, four types of colors can be assigned to each of the pixels of a sub-picture.

Note that, in actuality, any four colors are selected from a color pallet comprised of 16 types of colors and are used as the four types of colors assigned to each pixel of the sub-picture.

Further, to which of values (0 to 3) of the pixel data the selected four types of colors correspond and with which ratio the sub-picture and the main picture serving as the background are superimposed (for example, if the sub-picture is given a ratio of 0 percent and the moving picture is given a ratio of 100 percent, the sub-picture becomes transparent and cannot be seen. Further, if they are given in ratios of 50 percent and 50 percent, the sub-picture becomes semi-transparent and if they are given in ratios of 100 percent and 0 percent, the moving picture part at the background is completely hidden) are determined according to a separately provided table setting the same.

Figure 2A:
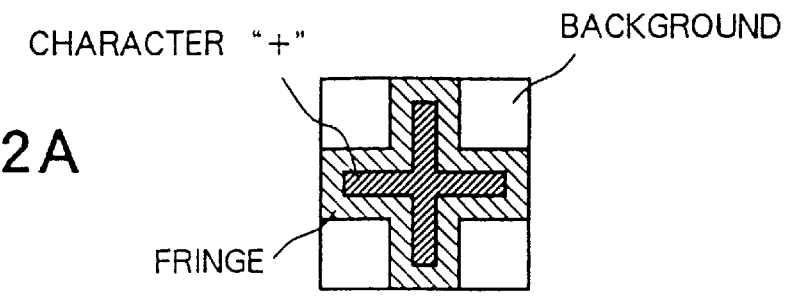
FIGS. 2A and 2B are views of an example of a sub-picture (character "+" (cross) with a fringe of a size of 9×9 pixels) defined in the DVD video disc standard.
Figure 2B:
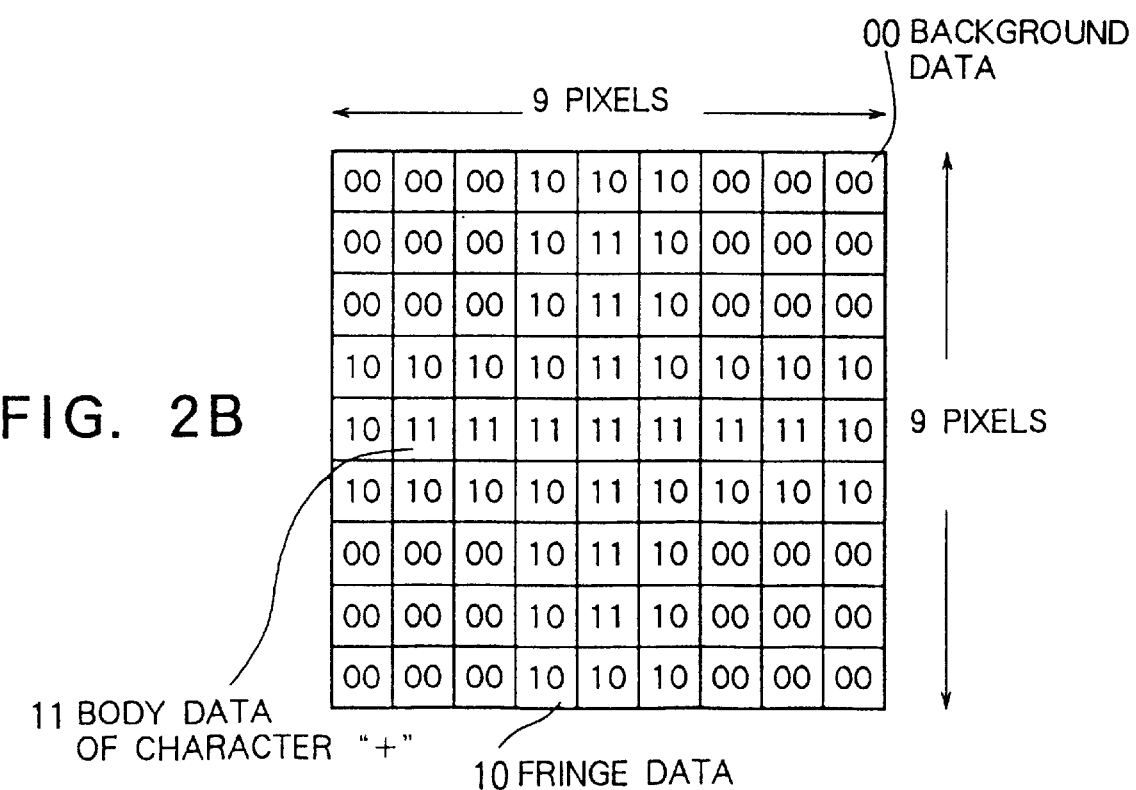

FIGS. 2A and 2B are views of an example of a sub-picture defined in the DVD video disc standard, specifically, a character "+" (cross) with a fringe of a size of 9×9 pixels.

For example, as shown in FIG. 2A, there are three colors required for a sub-picture displaying a "character "+" (cross) with a fringe" of a size of 9×9 pixels, i.e., a color of the background, a color of the body of the character "+" (cross), and a color fringing the body of the character "+".

If the pixel data 00 is used to indicate the color of the background, the pixel data 11 is used to indicate the color of the body of the character "+", and the pixel data 10 is used to indicate the color of the fringe, as shown in FIG. 2B, a set of 9×9 pixel data can be obtained. By finding this pixel data for all of the 720×478 pixels comprising one picture, one picture's worth of a DVD sub-picture can be obtained.

Further, for example, by placing the pixel data of letters and graphics in a region near the bottom in the region of the 720×478 pixels, placing the pixel data of the background in the other parts, and further controlling the ratio of mixing of the pixel data of the background with respect to the main picture to 0 percent, a transparent sub-picture displaying the letters and graphics at only the bottom of the picture and displaying the background as it is in all other parts can be generated.

In the DVD video disc standard, for example, the subtitless of a movie are shown by using the sub-picture in this way.

Explanation of Navigation Commands

Next, the navigation commands of the DVD video disc standard will be explained.

In the DVD video disc standard, a programming language referred to as navigation commands is prepared in order to control the method of reproduction by the DVD player. A program written by the navigation commands is recorded on the DVD together with the audio and/or video data. The DVD player reproduces the audio and video according to the order of the reproduction and timing indicated by the program written by the navigation commands.

In the DVD video disc standard, a plurality of audio channels can be recorded on the DVD in multiplexed manner. The program comprised by the navigation commands can for example designate which of a plurality of audio channels should be selected and reproduced by the DVD player. Further, the program comprised by the navigation commands can directly designate the start of the reproduction of the video data from the beginning of a highlight scene of the video data of the movie or a specific chapter indicating a break in a story to the DVD player.

These are examples of the operations of programs comprised of the simplest navigation commands.

There are also operations of programs comprised of more complex navigation commands.

For example, it is possible to prepare video data (software) which enables selection of the reproduction video in the form of a dialog (inter-actively), for example, displaying a still picture (sub-picture) posing a question to the viewer at the point of the end of reproduction of a certain chapter and deciding on the chapter from which the reproduction is to be started next in accordance with the answer of the viewer with respect to this question.

This inter-active reproduction mode is used when reproducing video data of a so-called "multi-story/multi-ending" work (a piece of work having a high game-like element in which there is a choice of A or B for every pause of scene and the next scene is determined by the result thereof).

Explanation of Menu Screen

When reproducing software for an inter-active reproduction mode such as the multi-story/multi-ending work mentioned above, a question and answer screen used for the DVD player displaying a question to the viewer (user) and carrying out an operation according to the response of the-user to the displayed question becomes necessary. This question and answer screen (menu screen) is by its nature suited for display as a still picture. Accordingly, as the question and answer screen, the above sub-picture is used.

The inter-active operation with respect to the DVD player (inter-active operation) is usually not directly carried out by the user depressing the operation buttons of a remote controller or the like, but is realized by indirectly selecting operation buttons displayed by the DVD player as icons on the menu screen by using a cursor key or the like provided on the remote controller. By such an indirect selection of operation buttons, it is possible to provide software which is not restricted to the functions of buttons inherent in the hardware of the DVD player and which is therefore suited for a variety of inter-active reproductions (inter-active software).

Note that, among the menu screens for the inter-active reproduction, the basic one is defined as the DVD system menu in the DVD video disc standard. This DVD system menu is a sub-picture which is called up by the user himself operating a "menu button", which is prescribed as having to be provided on the remote controller of the DVD player, when the DVD player reproduces the audio and/or video data from a DVD. The user can designate various reproduction patterns of the inter-active software by selecting the operation buttons displayed in the DVD system menu by using a cursor key, which also is prescribed as having to be provided on the remote controller of the DVD player according to the DVD video disc standard.

The DVD video disc standard provides for the DVD system menu as shown below.

1. Title Menu

The title menu is used by the user to designate which title of the audio and/or video data to reproduce when audio and/or video data of a plurality of titles (movies or animation stories) are recorded on a DVD.

2. Chapter Menu

The audio and/or video data of one title (one "movie" in the case of movies or one "album" in the case of music videos (video clips)—usually referred to as a "work") contains inherent internal breaks (changes in the case of movies, breaks in music in the case of video clips, and other breaks where the producer of the recording company desires to start something from the standpoint of the work). As explained above, these breaks are referred to as "chapters". The chapter menu arranges operation buttons for directly starting chapters on the screen.

3. Audio Menu

The audio menu is used by a user for selecting, for example, which audio to listen to when a plurality of audio channels are provided for each of the titles of the video data recorded on the DVD, for example, where the audio of the original language (original audio) and dubbed audios of a number of languages are provided for the video data of a movie.

The audio menu arranges operation buttons to which names of selectable languages are appended on the screen independently for all of the audio channels.

4. Subtitle Menu

The subtitle menu is used by a user for selecting which among a plurality of subtitles should be displayed or if not to display a subtitle when a plurality of subtitles are provided for a title recorded on the DVD.

The subtitle menu arranges operation buttons appended with names indicating the selectable subtitles on the screen independently for all of the subtitles.

5. Angle Menu

The "angle" is a function unique to the DVD video disc standard. For example, when recording a soccer match, usually a plurality of cameras are used. These cameras simultaneously film the game from different camera angles in parallel. That is, for example, the video data of a soccer game will contain data obtained from a camera shooting the entire game from a long perspective, data obtained from a camera following the offense side players in close-up, and data obtained from a camera following the defense side player in close-up.

The plurality of video data obtained by simultaneously shooting an object from a plurality of camera angles in parallel in this way are multiplexed and recorded on the DVD. The reproduction mode which enables a user to select which of the camera angles of the video data shot to reproduce is called the "multi-angle reproduction mode" as mentioned above.

The angle menu arranges operation buttons on which names etc. of selectable angles are appended on the screen independently for all of the angles.

6. Root Menu

The above five types of menus are determined in the DVD video disc standard. However, five operation buttons for displaying the five types of menus are not always provided on the remote controller of a DVD player. The DVD video disc standard only requires provision of two operation buttons, that is, an operation button for calling up the title menu and an operation button for calling up one of the other menus.

Accordingly, where the title to be reproduced requires one or more of the chapter menu, audio menu, sub-picture menu, and angle menu, a special menu screen used for calling up these menus becomes necessary.

The root menu is used when one or more of the chapter menu, auidio menu, sub-picture menu, and angle menu are necessary. The root menu arranges operation buttons appended with names of the chapter menu, audio menu, sub-picture menu, and angle menu individually.

Figure 3:
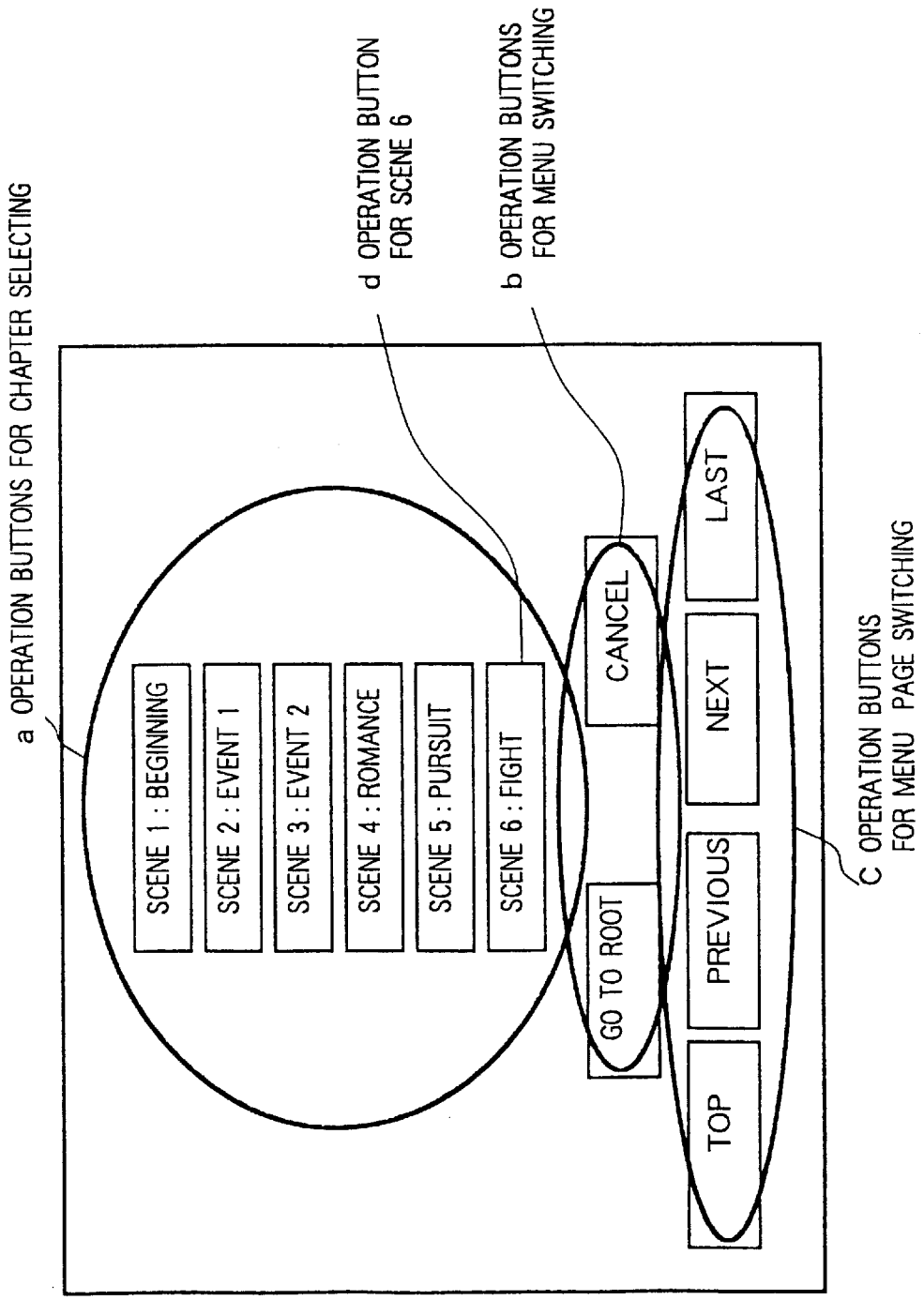
FIG. 3 is a view of an example of an actual chapter menu.

FIG. 3 is a view of an example of an actual chapter menu.

As shown in FIG. 3, on the chapter menu screen, three types of operation buttons of, for example, operation buttons a for designating chapter, operation buttons b for switching the menu, and operation buttons c for a switching menu pages are arranged.

When preparing (authering) such a chapter menu, it is necessary to prepare the pixel data corresponding to the operation buttons according to the sub-picture format of the DVD video disc standard and, also, to establish correspondence between the prepared operation buttons and the navigation commands of the program for controlling the reproduction of the audio and/or video data.

Explaining this establishment of correspondence by using the terminology of the DVD video disc standard, this is done by using the data TT DOMAIN NUMBER x and data PTT NUMBER y of the table TT_SRPT indicating the sector address at the point of time of the start of the recording on the DVD of the chapter (scene 6: fight 1) of the audio and/or video data to generate a binary code of the navigation command JumpPTT (TT=x, PTT=y) and entering this at a position corresponding to BTN_POSI of BTINT in HLI of PCI indicating the position of the operation buttons d (FIG. 3) of scene 6:fight 1 in the screen in the table contained in the button command BTN_CMD (type of navigation command).

Below, an explanation will be made of the relationship between the menu screen and data.

FIGS. 4A to 4C are views of the configuration of the data comprising the menu screen (menu screen data). Note that the menu screen data is actually further divided into smaller units, but for the simplification of the illustration and explanation, in FIGS. 4A to 4C, only parts necessary for the explanation of the DVD recording apparatus according to the present invention are shown. Further, among the reference symbols attached to the data, $N_1$ to $N_3$ indicate data of navigation commands and $S_1$ to $S_{10}$ indicate the menu screen data.

The configuration of the data comprising the above six types of menu screens (title menu, chapter menu, audio menu, sub-picture menu, angle menu, and root menu) (menu screen data) is as shown in FIGS. 4A to 4C.

The program chain PGC (Program Chain) (FIG. 4A) has meaning as the framework of one menu screen. It contains all menu screen data and indicates the unit of reproduction of the menu screen and the audio and/or video data of the titles of the movies etc. in the DVD player.

Note that there are cases where one menu screen will be comprised of a number of pages. Irrespective of the number of pages comprising the menu, however, one program chain PGC corresponds to one menu. That is, for example, there are six program chains PGC corresponding to the six types of menus (menus each comprised of a plurality of pages). Further, when one menu screen is comprised by a plurality of pages, the internal portion of the program chain PGC is divided into a plurality of units referred to as "cells".

In order to compose one menu screen, it is necessary to write all of the data contained in the data structure shown in FIGS. 4A to 4C. Below, an explanation will be made of each data contained in the program chain PGC.

Precommand PRE_CMD ($N_1$ of FIG. 4A)

The pre-command PRE_CMD writes the navigation command to be executed first when the reproduction of one menu screen (program chain PGC) starts (mainly command for initialization of parameters necessary for execution of the button command BTN_CMD ($N_3$ of FIG. 4C)).

Access unit ACCESS_UNIT ($S_1$ of FIG. 4A)

The access unit ACCESS_UNIT stores the data (pixel data and color data) of sub-picture (FIG. 1 and FIGS. 2A and 2B) of the menu screen and contains sub-picture pixel data ($S_3$ of FIG. 4B) and button color data BTN_COLOR ($S_4$ of FIG. 4B) as shown in FIG. 4B.

Highlight information data HLI ($S_2$ of FIG. 4A)

When the user selects an operation button of the menu screen by using the cursor key etc. of the remote controller, the DVD player changes the color of the selected operation button. The processing for changing the color of the selected operation button in this way will be referred to as "highlight processing". The highlight information data HLI stores the color data used for the highlight processing and contains highlight color data (Highlight COLOR $S_5$ of FIG. 4B) indicating the colors before and after the execution of the highlight processing (highlight colors), a relative positional relationship of the operation buttons in the menu, adjacent information between buttons necessary for the selection of the operation button by the cursor key of the remote controller of the DVD player, and button information data BTN_INFO ($S_6$ of FIG. 4B) indicating the navigation command corresponding to the operation button.

Post-command POST_CMD ($N_2$ of FIG. 4A)

In the post-command POST_CMD, the navigation command to be executed last (mainly jump command for jumping to the destination of the branch determined by the parameter obtained as the result of execution of the button command BTN_CMD ($N_4$ of FIG. 4C)) is written at the end of reproduction of the video data of the title corresponding to one menu screen (program chain PGC).

Sub-picture pixel data ($S_3$ of FIG. 4B)

The sub-picture pixel data stores the data of the sub-picture (FIG. 1 and FIGS. 2A and 2B) used as the menu screen. Note that when the menu screen is comprised by a plurality of pages, a plurality of series of sub-picture pixel data are provided corresponding to the plurality of pages.

Further, as mentioned above, the sub-picture pixel data is a constituent element of the access unit ACCESS_UNIT.

Button color data BTN_COLOR ($S_4$ of FIG. 4B)

The button color data BTN_COLOR stores the data indicating the color palette referred to by the color information when the operation button is not highlighted (time of nonselection) and the color information when the operation button is highlighted (time of selection). Note that, as mentioned above, the button color data BTN_COLOR is a constituent element of the access unit ACCESS_UNIT.

Highlight color data ($S_5$ of FIG. 4B)

The highlight color data stores the color information used for the highlight processing of the operation button. This color information is not information as to the actual color of the operation button, but contains pointers to the color palette indicated by the button color data BTN_COLOR. It contains the highlight color at the time of selection of the operation button and the highlight color at the time of execution of the button command BTN_CMD. Note that, as mentioned above, the highlight color data is a constituent element of the highlight color data HLI and contains the selection color data SELECT_INFO ($S_7$ of FIG. 4C) and the action color data ACTION_COLOR ($S_8$ of FIG. 4C).

Button information data BTN_INFO ($S_6$ of FIG. 4B)

The button information data BTN_INFO stores the relative positional relationship of the operation buttons in the menu screen, adjacent information between buttons which becomes necessary when changing the selection of a button by the cursor key of the remote controller of the DVD player, and the navigation commands at the time of execution accompanying the operation buttons and plays a central role as the portion for describing the functional logic of the operation buttons of the menu screen. Note that, as mentioned above, the button information data BTN_INFO is a constituent element of the highlight color data HLI and contains button position data BTN_POSITION ($S_9$ of FIG. 4C), adjacent button data ADJ_BTN ($S_{10}$ of FIG. 4C), and a button command BTN_CMD ($N_3$ of FIG. 4C).

Selection color data SELECT_COLOR ($S_7$ of FIG. 4C)

The selection color data SELECT_COLOR stores the pointer to the color palette of the highlight color at the time of selection of an operation button.

Action color data ACTION_COLOR ($S_8$ of FIG. 4C)

The action color data ACTION_COLOR stores the pointer to the color palette of the highlight color at the time of execution of an operation button (the time when the button command BTN_CMD is executed by the DVD player and the time immediately after the execution). Note that, as mentioned above, the action color data ACTION_COLOR is a constituent element of the highlight color data.

Button piosition data BTN_POSITION ($S_9$ of FIG. 4C)

The relative position of the operation buttons in the menu screen is expressed by the coordinates of the pixels of the operation buttons. The button position data BTN_POSITION stores the top left and bottom right coordinates of the logical display region of the operation buttons, set as rectangles, and the pointers to the color palette (of data BTN_COLOR) of the color information at the time of nonselection of the operation buttons Note that, in one menu screen, irrespective of the number of the operation buttons, there is only one type of color indicating nonselection. Further, as mentioned above, the button position data BTN_POSITION is a constituent element of the button information data BTN_INFO.

Adjacent button data ADJ_BTN ($S_{10}$ of FIG. 4B)

The adjacent button data ADJ_BTN stores the adjacent information between buttons—which becomes necessary at the time of selection of an operation button using the cursor key of the remote controller of the DVD player. Note that, as mentioned above, the adjacent button data ADJ_BTN is a constituent element of the button information data BTN_INFO.

Button command BTN_CMD ($N_3$ of FIG. 4C)

The button command BTN_CMD stores the navigation command at the time of execution of an operation button and directly defines the function of each of the operation buttons. Note that, as mentioned above, the button command BTN_CMD is a constituent element of the button information data BTN_INFO.

As mentioned above, there are 1,400 or more types of navigation commands. In addition, in order to carry out programming using the navigation commands, it is necessary for an editor to be well versed in the meaning of all of the navigation commands and the contents of the DVD video disc standard. Accordingly, it is very difficult for a general editor to carry out the programming using the navigation commands.

Further, as shown in FIGS. 4A to 4C, there are many types of data necessary for preparing the sub-picture pixel data used as the menu screen, and it is very troublesome to prepare all of these data for every menu screen. Accordingly, if the pixel data of the sub-picture can be systematically prepared, the efficiency of the editing work would be improved and it would become possible to shorten the working time.

An object of the DVD recording apparatus 1 (FIG. 5 etc.) according to the present invention explained below is to use an encoder provided exclusively for the menu screen (for example a sub-picture encoder 2 shown in FIG. 5) and carry out software control of the flow of the logic of the constituent elements of the encoder by computer so as to eliminate the difficulty of and simplify programming using navigation commands and the preparation (authering) of a menu screen (sub-picture pixel data).

Further, another object of the DVD recording apparatus 1 according to the present invention is to provide a user friendly environment in which an editor can efficiently carry out programming using navigation commands and prepare sub-pictures of the menu screen in a short time in a dialog format by specially modifying the contents of the operation screen displayed by the computer and the display method.

Configuration of DVD recording apparatus 1

Figure 5:
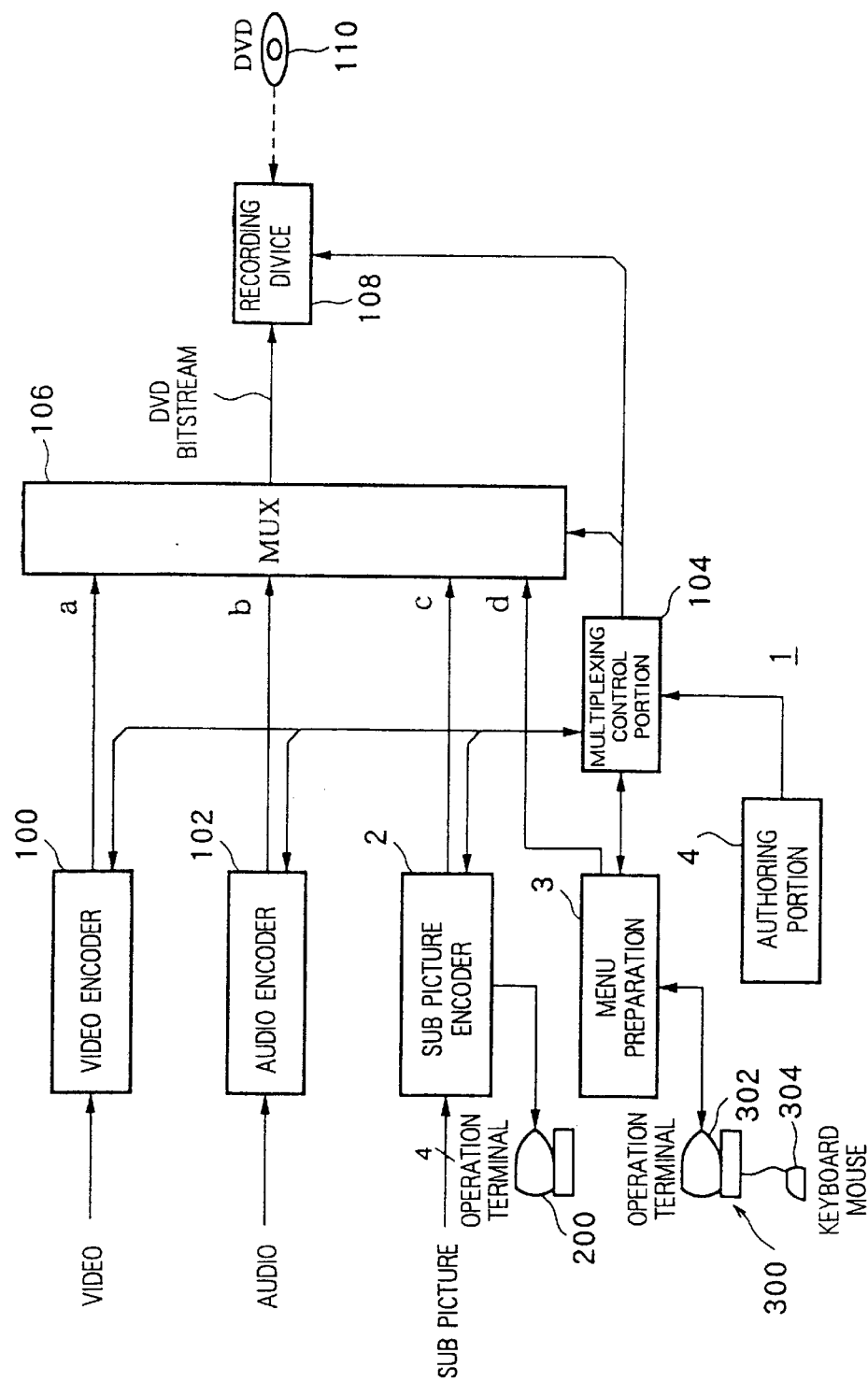
FIG. 5 is a view of the configuration of a DVD recording apparatus according to a first embodiment of the present invention.

FIG. 5 is a view of the configuration of the DVD recording apparatus 1 according to a first embodiment of the present invention.

As shown in FIG. 5, the DVD recording apparatus 1 is constituted by a video encoder 100, an audio encoder 102, a sub-picture encoder 2, an operation terminal 200, a menu preparation portion 3, an operation terminal 300 having a CRT display device 302 and an input device 304 having a keyboard and a mouse, a multiplex control portion 104, a multiplexing portion 106, a recording device 108, and an editing device 4.

The DVD recording apparatus 1 generates compressed audio and/or video data (main picture) obtained by compressing and coding noncompressed audio and/or video data of a moving picture such as a movie by the MPEG (Moving Picture Experts Group) 2 system and the sub-picture of a still picture such as a menu screen to be displayed superimposed on this compressed video data, multiplexes the same, and records the resultant data on for example a DVD 110 by these constituent parts according to the DVD video disc standard.

Explanation of constituent parts of DVD recording apparatus 1

Below, the operation of the constituent parts of the DVD recording apparatus 1 (FIG. 5) will be explained.

Editing device 4

The editing device 4 controls the constituent parts of the DVD recording apparatus 1 according to the operation of the editor (user) to carry out the editing of the main picture and sub-picture.

Multiplex control portion 104

The multiplex control portion 104 controls the operation of the constituent parts of the DVD recording apparatus 1 based on data such as the time code input from the video encoder 100, audio encoder 102, sub-picture encoder 2, and menu preparation portion 3 and the operation data input to the operation terminal 200 or the operation terminal 300 by the user.

Video encoder 100

The video encoder 100 compresses and codes the non-compressed moving picture video data input from a digital video tape recorder apparatus (VTR apparatus, not illustrated) connected to for example the DVD recording apparatus 1 by the MPEG2 system under the control of the multiplex control portion 104 to generate the compressed video data (main picture) of the moving picture and outputs the same to the input terminal a of the multiplexing portion 106.

Audio encoder 102

The audio encoder 102 compresses and codes the non-compressed audio data input from a digital VTR apparatus connected to for example the DVD recording apparatus 1 by the MPEG2 system under the control of the multiplex control portion 104 to generate the compressed audio data and outputs the same to the input terminal b of the multiplexing portion 106.

Multiplexing portion 106

The multiplexing portion 106 multiplexes either of the compressed video data input from the video encoder 100 to the input terminal a, the compressed audio data input from the audio encoder 102 to the input terminal b, and the data input from the sub-picture encoder 2 and the menu preparation portion 3 to the input terminals c and d (sub-picture pixel data (FIG. 3), navigation commands, and the menu screen data (FIGS. 4A to 4C)) according to the DVD video disc standard under the control of the multiplex control portion 104 to generate a DVD bit stream and outputs the same to the recording device 108.

Recording device 108

The recording device 108 records the DVD bit stream input from the multiplexing portion 106 on the DVD.

Sub-picture encoder 2

Figure 6:
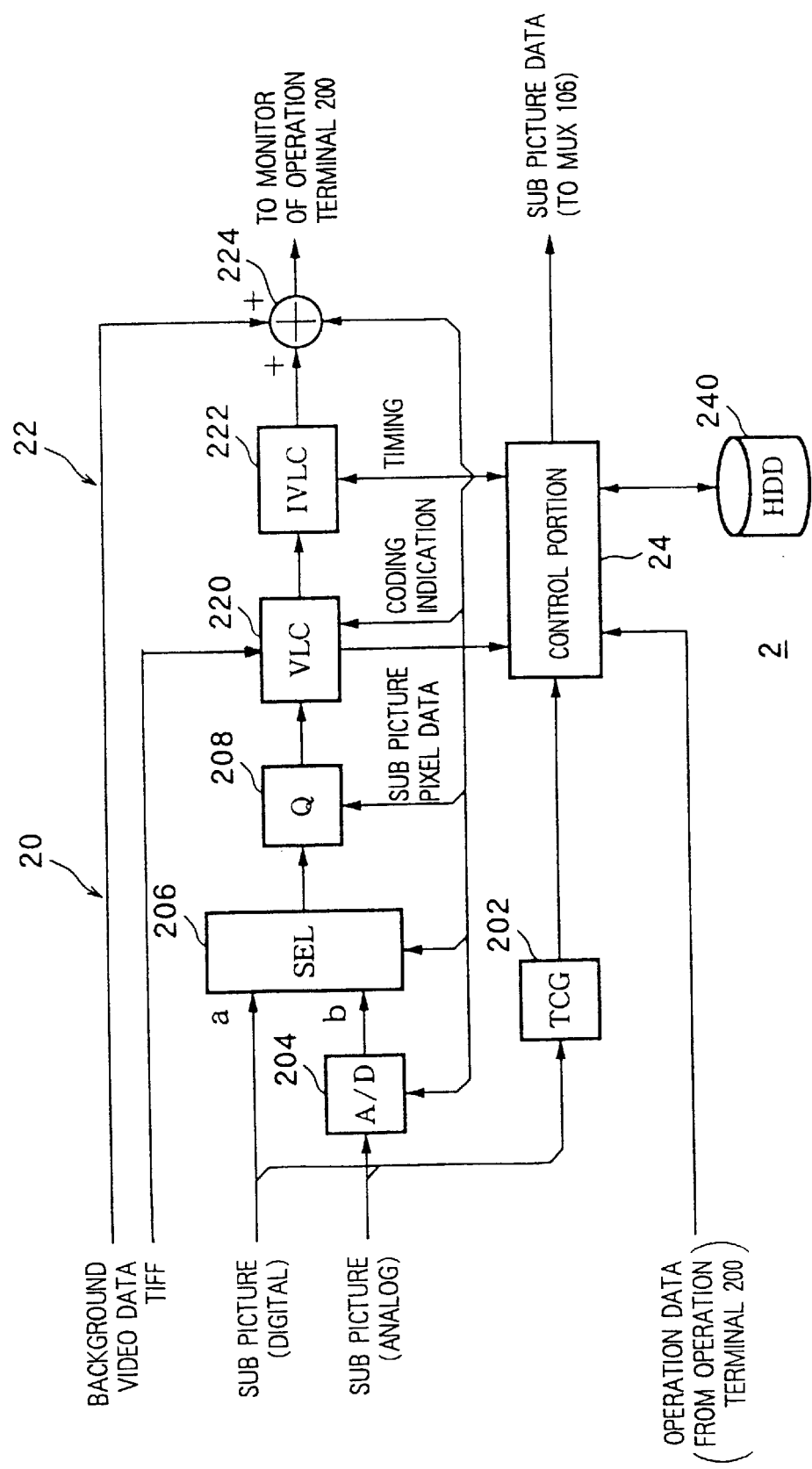
FIG. 6 is a view of the configuration of a sub-picture encoder of the DVD recording apparatus shown in FIG. 5.

FIG. 6 is a view of the configuration of the sub-picture encoder 2 of the DVD recording apparatus 1 shown in FIG. 5.

Figure 7:
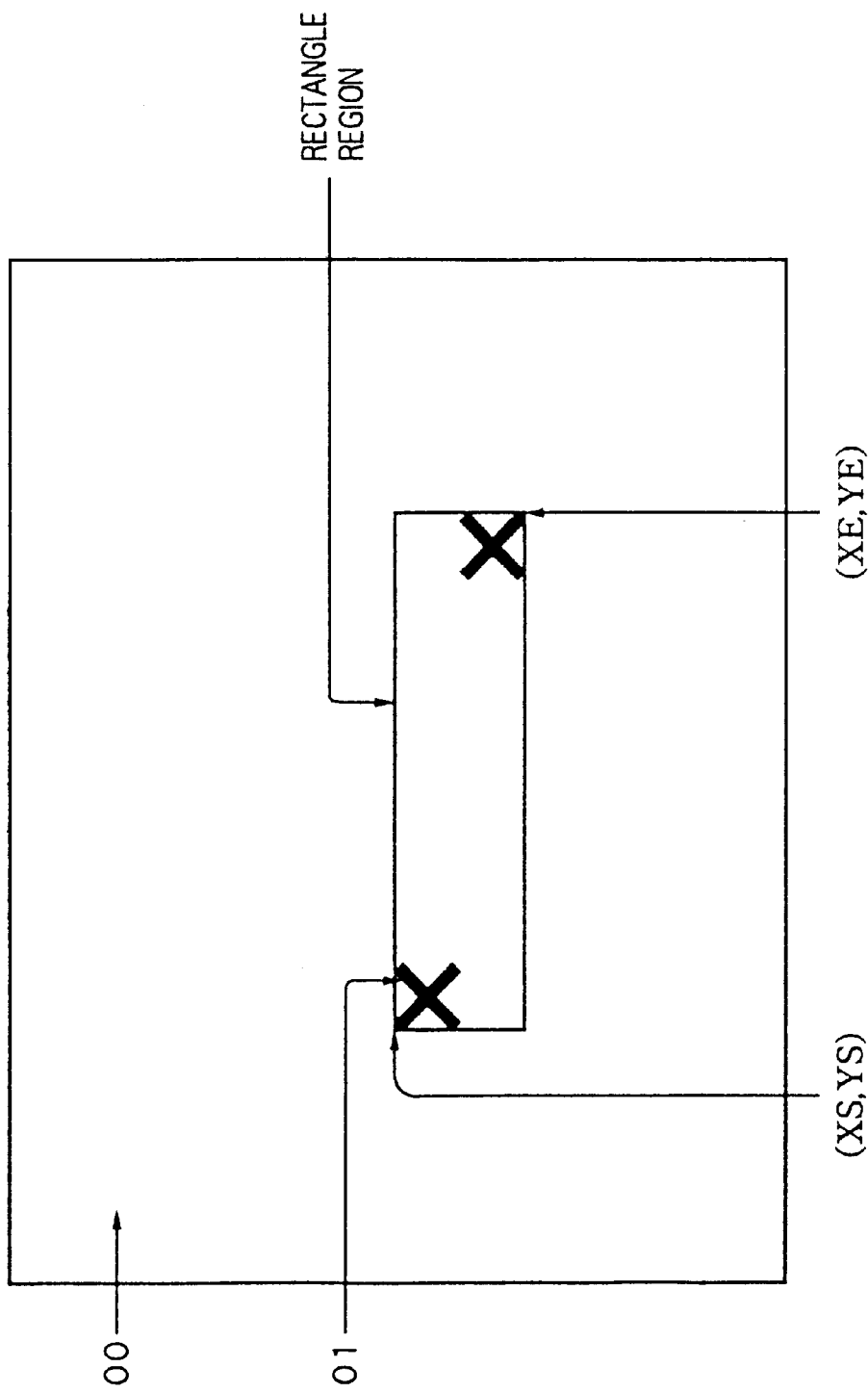
FIG. 7 is a view for indicating coordinates of a rectangular region in which the sub-pictures derived by a control unit of the DVD recording apparatus shown in FIG. 5.

FIG. 7 is a view of the coordinates indicating a rectangular region in which the sub-picture derived by the control portion 24 of the DVD recording apparatus 1 shown in FIG. 5 exists.

As shown in FIG. 6, the sub-picture encoder 2 is constituted by a quantization portion 20, a coding circuit 22, the control portion 24, and a hard disc drive 240.

The quantization portion 20 is constituted by a time code generation circuit (TCG) 202, an analog/digital conversion circuit (A/D conversion circuit) 204, a selector circuit (SEL) 206, and a quantization circuit (Q) 20.

The coding circuit 22 comprises by a variable length coding circuit (VLC) 220, a decoding circuit (IVLC) 222, and an adder circuit 224.

The sub-picture encoder 2 quantizes the video signal of the sub-picture of the analog format input from an analog VTR apparatus (not illustrated) connected to an external device etc. or a luminance signal of the video data of the 8-bit digital format input from the VTR apparatus or the computer connected to an external device (both not illustrated) to quadrary values (2 bits; 00d, 01d, 10d, and 11d) so as to be suitable as the pixel data (FIG. 1 and FIGS. 2A and 2B) of the sub-picture of the DVD video disc standard, variable length encodes the pixel data of the quantized sub-picture, outputs the same to the input terminal c of the multiplexing portion 106, and, at the same time, decodes the pixel data of the variable length encoded sub-picture, superimposes the same on the video data of the moving picture serving as the background (main picture), and displays the same on the monitor device of the operation terminal 200 to indicate it to the editor (user) by these constituent parts.

In the sub-picture encoder 2, the A/D conversion circuit 204 converts the luminance signal of the video data of the analog format input from the external device to the digital format and outputs the same to the input terminal b of the selector circuit 206.

The selector circuit 206 selects either of the luminance signals of the video data of the digital format input from the external device and the A/D conversion circuit 204 to the input terminals a and b and outputs the same to the quantization circuit 208.

The quantization circuit 208 quantizes the luminance signal of the video data of the 8-bit digital format input from the selector circuit 206, for example, the range of the value of the luminance signal from 0 to 63 (00h to 3Fh), to the value 0 (00) of the pixel data, the range of the value of the luminance signal from 64 to 127 (40h to 7Fh) to the value 1 (01) of the pixel data, the range of the value of the luminance signal from 128 to 191 (80h to BFh) to the value 2 (10) of the pixel data, and the range of the value of the luminance signal from 192 to 255 (C0h to FFh) to the value 3 (11) of the pixel data, and outputs the quantization result to the variable length coding circuit 220.

The variable length coding circuit 220 run-length codes the quantization result input from the quantization circuit 208 and outputs the result as the sub-picture pixel data to the control portion 24 and the decoding circuit 222.

The control portion 24 is a computer comprising, for example, a microprocessor (CPU), a memory, and periphery circuits of the same and controls the operation of the constituent parts of the DVD recording apparatus 1 based on the data input from the constituent parts of the DVD recording apparatus 1.

Further, the control portion 24 buffers the sub-picture pixel data input from the variable length coding circuit 220 or records and reproduces the same by using for example the hard disc drive 240 and output this to the multiplexing portion 106 (FIG. 5) at a timing indicated by the time code of the sub-picture pixel data.

Further, the control portion 24 controls the timing etc. of the fetching of the data of the variable length coding circuit 220 and the decoding processing of the decoding circuit 222 based on the result of comparison between the range of the time code of each of the sub-pictures contained in the indication data input from the operation terminal 200 (FIG. 5) or the editing device (not illustrated) etc. and indicating the object of the encoding and the time code TC of the video data input from the time code generation circuit 202.

Further, the control portion 24 decides that there is a sub-picture within a range where there is a pixel with a value of the quantization result input from the quantization circuit 208 becoming 1 to 3 (01 to 11) as shown in FIG. 7 (decides there is a part where only pixels with a value of the quantization result becoming 0 (00) exist as there is no sub-picture) based on the result of encoding of the sub-picture encoder 2, derives the rectangular region in which the sub-picture exists, and finds the coordinate values indicating the top left and bottom right of this rectangular region ((XS, YS), (XE, YE)). Note that the coordinate values ((XS, YS), (XE, YE)) of the rectangular region found by the control portion 24 are used for the control of the superimposing processing of the background video and sub-picture by the adder circuit 224.

Figure 4:
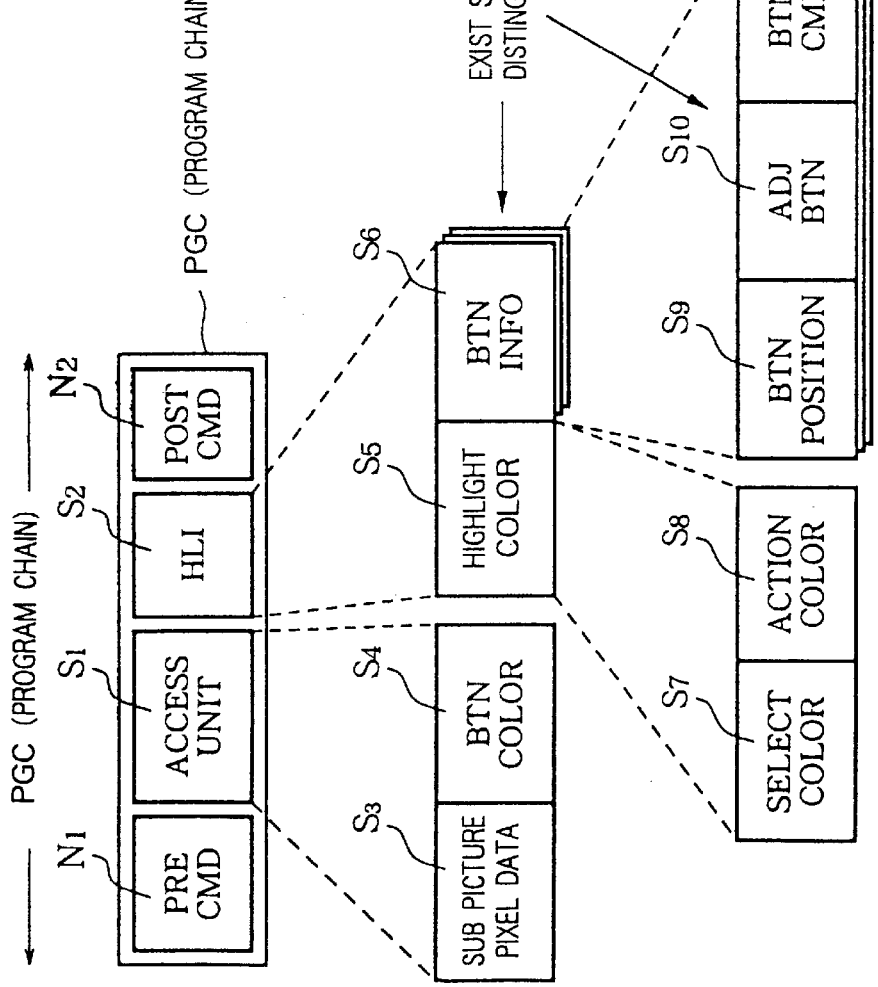
FIGS. 4A to 4C are views of the configuration of data comprised in a menu screen (menu screen data)

Further, the control portion 24 generates the sub-picture pixel data shown in FIG. 3 and the navigation commands and the menu screen data shown in FIG. 4 and outputs the same to the multiplexing portion 106 together with the sub-picture pixel data.

The decoding circuit 222 carries out the inverse processing to that of the variable length coding circuit 220 with respect to the sub-picture data input from the variable length coding circuit 220, generates the data corresponding to the result of quantization of the quantization circuit 208, and outputs the same to the adder circuit 224.

The adder circuit 224 multiplies the coefficient k ($0 \geq k \geq 1$) with the pixel data of the part of the rectangular region shown in FIG. 7 among the results of quantization input from the decoding circuit 222 according to the control of the control portion 24, multiplies a coefficient (1−k) with the background video data input from the external device (background; for example the same as the video data input to the video encoder 100 (FIG. 5)), adds these multiplied values, and outputs the same to the monitor device of the operation terminal 200. Note that the adder 224 passes the background video data other than that of the rectangular region as it is without carrying out the multiplication with the coefficient (1−K) and the addition of the quantization value multiplied by the coefficient k.

The monitor device of the operation terminal 200 displays the video data input from the adder circuit 224 to indicate this to the user of the DVD recording apparatus 1. The user can confirm the darkness of the video of the sub-picture or the timing etc. of the display of the sub-picture while viewing the video displayed on the monitor device of the operation terminal 200 and further inputs the data to the sub-picture encoder 2 via the operation terminal 200 to adjust the darkness of the video of the sub-picture (coefficient k (1−k)) and the timing etc. of display.

Menu preparation portion 3

Figure 8:
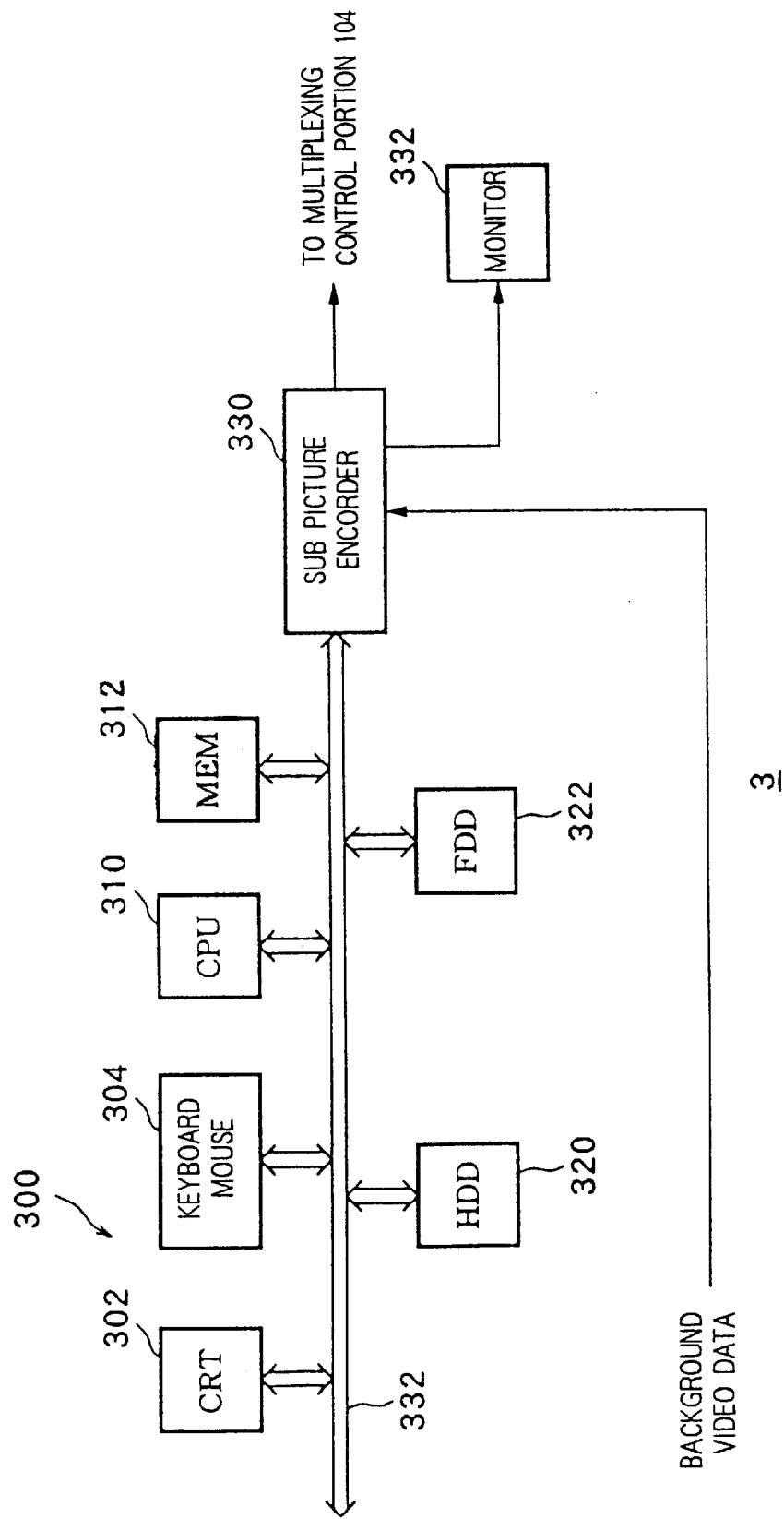
FIG. 8 is a view of the configuration of a menu preparation portion of the DVD recording apparatus shown in FIG. 5.

FIG. 8 is a view of the configuration of the menu preparation portion 3 of the DVD recording apparatus 1 shown in FIG. 1.

As shown in FIG. 8, the menu preparation portion 3 adopts a configuration similar to that of the computing device of a general PC etc. It is constituted by an operation terminal 300, a microprocessor (CPU) 310, a memory (MEM) 312, a hard disc drive (HDD) 320, a floppy disc drive 322, and a sub-picture encoder 330 which are connected via a bus 332. A monitor device 332 is further connected to the sub-picture encoder 330. The operation terminal 300 is constituted by a CRT display device 302 and an input device 304 having a keyboard and mouse as shown in FIG. 5.

The menu preparation portion 3 is configured so as to enable the user to write the data comprising the menu screen without omission of required data and without having to be aware of the data structure shown in FIG. 3 by these constituent parts and, in addition, to prevent the occurrence of an error due to mistaken writing of the data by the user before occurrence. That is, the menu preparation portion 3 acts as a compiler having a very high intelligence used only for preparation (authering) of a sub-picture of the navigation command and menu screen.

The user can proceed with the work for writing the data by a dialog format (inter-actively) by a GUI (Graphical User Interface) provided by the menu preparation portion 3. The menu preparation portion 3 automatically prepares the data comprising the menu screen suited to the data structure shown in FIG. 4 by software processing by using the data inter-actively written by the user and, at the same time, carries out the superimposing of the data on the background video and displays the same to indicate it to the user.

Explanation of constituent parts of the menu preparation portion 3

In the menu preparation portion 3, the microprocessor 310 executes the program stored in the memory 312 to control the operation of the constituent parts of the menu preparation portion 3.

Further, the microprocessor 310 displays the menu preparation use image (mentioned later by referring to FIG. 9 to FIG. 13) in the menu preparation portion 302 of the operation terminal 300 to indicate the same to the user.

Further, the microprocessor 310 generates the navigation commands ($N_1$ and $N_2$ of FIG. 4A and $N_3$ of FIG. 4C) comprising the menu screen shown in FIGS. 4A to 4C and the data of the menu screen ($S_1$, $S_2$, and $S_4$ to $S_{10}$ of FIGS. 4A to 4C) by using the operation data input by the user to the input device 304 of the operation terminal 300 by the inter-active operation in accordance with the menu preparation use image displayed in the menu preparation portion 3 and outputs the same to the hard disc drive 320 and the floppy disc drive 322.

Further, the microprocessor 310 generates the pixel data ($S_3$ of FIG. 4B) of for example the still picture (sub-picture) shown in FIG. 3 by using the generated data of menu screen or data of the menu screen reproduced by the hard disc drive 320 or the floppy disc drive 322 and outputs the same to the sub-picture encoder 330.

The hard disc drive 320 and the floppy disc drive 322 record the navigation command, sub-picture data (FIGS. 4A to 4C), and the sub-picture pixel data (FIG. 3) generated by the microprocessor 310 under the control of the microprocessor 310, reproduces the recorded data, and output the same to the microprocessor 310.

The sub-picture encoder 330 encodes the pixel data of the sub-picture generated by the microprocessor 310 or the pixel data of the sub-picture reproduced by the hard disc drive 320 or the floppy disc drive 322 in the same way as the sub-picture encoder 2 shown in FIG. 5 and FIG. 6, outputs the same to the multiplexing portion 106 (FIG. 5), and, at the same time, carries out the processing for superimposition of the same on the background video (background) and displays this on the monitor device 332 to indicate it to the user.

Explanation of contents of GUI screen and data corresponding to operation buttons Below, an explanation will be made of the contents of the GUI screen displayed by the microprocessor 310 of the menu preparation portion 3 and the data corresponding to tire windows and icons in the GUI screen.

The software processing by the microprocessor 310 is characterized in that the user can carry out the authering work with a high efficiency by arranging and classifying the structure of the navigation commands and menu screen data shown in FIGS. 4A to 4C again and further displaying the GUI (graphical user interface) screen on which these data are brought into one-to-one correspondence with icons without making the user feel uncomfortable at the time of authering work. In addition, navigation commands and menu screen data free from contradiction are obtained as the result of the authering work.

The data shown in FIGS. 4A to 4C and the work of the user when preparing these data are classified into three types as shown in brief in the following Table 1.

TABLE 1

| | Type of data shown in FIG. 4 | Work of user |
|---|---|---|
| 1 | Program chain PGC Link relationship among PCGs Post-command POST_CMD | Work of determining type and number of menus |
| 2 | ACCESS_UNIT | Refer to sub-picture pixel data Prepare ACCESS_UNIT |
| 3 | HLI | Assign functions of operation buttons of menu screen |

Index input operation use GUI image

Figure 9:
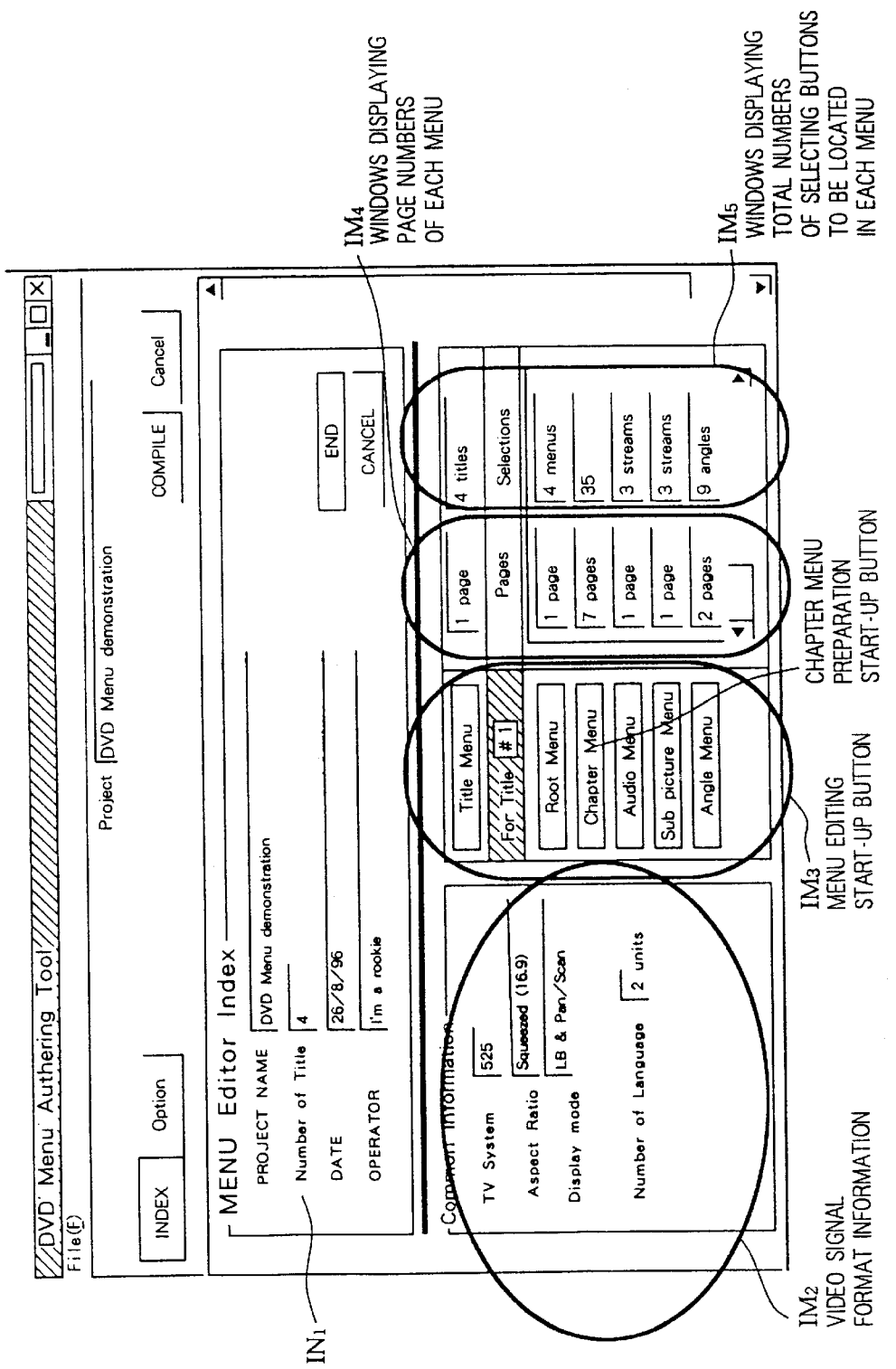
FIG. 9 is a view of a first GUI image for an index input operation displayed on a CRT display device of an operation terminal by a microprocessor (CPU) shown in FIG. 8.

FIG. 9 is a view of the first GUI image for the index input operation displayed by the microprocessor 310 shown in FIG. 8 on the CRT display device 302 of the operation terminal 300.

The index input operation use GUI image shown in FIG. 9 is used for the input of the data indicating how many types of menu screens exist. Below, an explanation will be made of the windows (buttons) and icons of the index input operation use GUI image.

Title number $IM_1$

When the user clicks the window $IM_1$ (Number of Title) of the GUI image for index input by the mouse of the input portion 304 and inputs the data indicating the number of titles, the microprocessor 310 decides on the number of the program chains PGC (FIG. 4A) based on the input data indicating the number of types of menu screens. For every title, there are five menus including the root menu, audio menu, and chapter menu, therefore, in this case, there are 21 program chains PGC at a maximum (maximum menu number=(IM position×5+1)). Note, the existence of individual menus is defined by the page number thereof. 0 page is also allowed. Therefore, there also exists a case where the number of program chains PGC is less than 21.

Video format information window $IM_2$

Among the icons contained in the video format information window, an icon TV_System is used by the user for designating whether to record a DVD bit stream for NTSC or record a DVD bit stream for PAL on the DVD 110 (FIG. 5).

An icon Aspect_Ratio is used by the user for designating whether to record a DVD bit stream for a 4:3 (usual) screen or record a DVD bit stream for a 16:9 (wide) screen on the DVD 110.

An icon Display_mode is used by the user for designating the mode of the display device displaying the audio and/or video data reproduced from the DVD 110.

An icon Number_of Language is used for designating the number of types of the audio data contained in the DVD bit stream.

These designation information are not directly related to the processing for preparation of the menu screen data and the navigation commands shown in FIGS. 4A to 4C. However, when preparing the menu screen data and navigation commands for a 16:9 wide screen, the original noncompressed video data (image source; video) input to the DVD recording apparatus 1 has become squeezed in state (vertically long), therefore it becomes necessary to note the following.

When the image source has become squeezed in state (squeezed image source), the video becomes correct in form (proportion) if it is viewed by a wide television of a 16:9 screen, but the video becomes vertically elongated if it is viewed by a television of a usual 4:3 screen. Therefore, when displaying the video on a usual television, the correct proportion must be obtained by outputting the video while shrinking the same in the vertical direction (letterbox output) or outputting the video while cutting off parts of the left and right ends of the video (pan-scan output).

On the other hand, the sub-picture data of the menu screen is displayed while superimposed on thee video data (main picture), therefore the positions of the operation buttons in the menu screen end up deviated from the letterbox output main picture. Therefore, it Is necessary to correct this deviation.

Accordingly, as the access unit shown in FIG. 4A, three types—for wide, letterbox, and pan scan—become necessary.

Menu editing start-up button window $IM_3$

The menu editing start-up button window is actually used for starting up the editing of each of the root menu, chapter menu, audio menu, subtitle menu, and angle menu and has icons corresponding to these menu screens.

Page number display window $IM_4$ of each menu screen

The page number display window $IM_4$ is used by the user for designating the page number of each of the menu screens.

Total number window $IM_5$ of selection buttons which should be arranged on each menu screen The operation buttons arranged in menus for purposes other than the purpose of forwarding the page of the menu screen or purpose of switching the menu screen, for example, the purpose of designating the chapter, purpose of designating the type of the audio which should be reproduced, or purpose of designating the angle, will be referred to as the selection buttons. The total number window for the selection buttons is used by the user for designating the total number of the selection buttons.

Contents of the work with respect to the index input operation use GUI image and processing of same Below, an explanation will be made of the work for inputting data carried out by the user with respect to the index input operation use GUI image and the contents of the processing carried out by the microprocessor 310 based on the designated data by taking as an example a case where the chapter menu image shown in FIG. 3 is prepared.

First, the user designates the information of the DVD bit stream (NTSC/PAL, 4:3 screen/16:3 screen, eto.) in the video format information window $IM_2$ of the index input operation use GUI (Step 1-1 (S1-1)).

Next, the user inputs the page number of each menu screen to the page number display window of each menu screen. Note that, where there is no corresponding menu screen, a number 0 is input to the page number display window.

Where there is one or more of the chapter menu screen, audio menu screen, sub-picture menu screen, and angle menu screen, it becomes necessary to write the post-command POST_CMD ($N_2$ of FIG. 4A) of the root menu for the control of the menu screen. The microprocessor 310 determines the program chain PGC of the menu screen as the destination of the branch to be written on the post-command POST_CMD of the root menu based on the relationship between the root menu and the other menu screens and stores the same in the memory 312 (Step 1-2 (S1-2)).

The user designates the total number of the selection buttons among the operation buttons to be arranged in each menu screen in the selection button total number window $IM_5$ to be arranged on each menu screen. The functions and purposes of the selection buttons are specified by the features of the menu screen, for example, the selection button of the chapter menu is used for selecting the chapter number, the selection button of the audio menu is used for selecting the channel number of the audio data to be multiplexed on the DVD bit stream, and the selection button of the angle menu is used for selecting the angle number which can be selected. Accordingly, the microprocessor 310 determines the candidates of the button command BTN_CMD ($N_3$ of FIG. 4C) in accordance with the type of the menu screen and stores the same in the memory 312 (Step 1-3 (S1-3)).

The user starts up the menu preparation use GUI screen by clicking the desired icon of the menu editing start-up button window $IM_3$ by the mouse of the input device 304 of the operation terminal 300 (Step (S1-4)). After this operation, the user and the microprocessor 310 proceed to the work and processings of S2-1 to S2-10 mentioned later.

Note that, below, in the first embodiment, the explanation will be made taking as an example a case where the user clicks the icon Chapter_Menu of the menu editing start-up button window $IM_3$ and carries out the work for preparing the chapter menu screen, but the work of the user and the processing of the microprocessor 310 when preparing another type of menu screen are similar to those of the case where the chapter menu screen is prepared.

Whenever the preparation of one menu screen is ended, the microprocessor 310 displays the index input operation use GUI image. Where there is another menu screens which should be further prepared, the user successively clicks the icon of the menu editing start-up button window $IM_3$ and continues the editing work (Step 1-5 (S1-5)). When is no longer a menu screen which should be further prepared, the user and the microprocessor 310 end the work and processing for the preparation of the menu screens (Step 1-6 (S1-6)).

Chapter menu editing use GUI image

Figure 10:
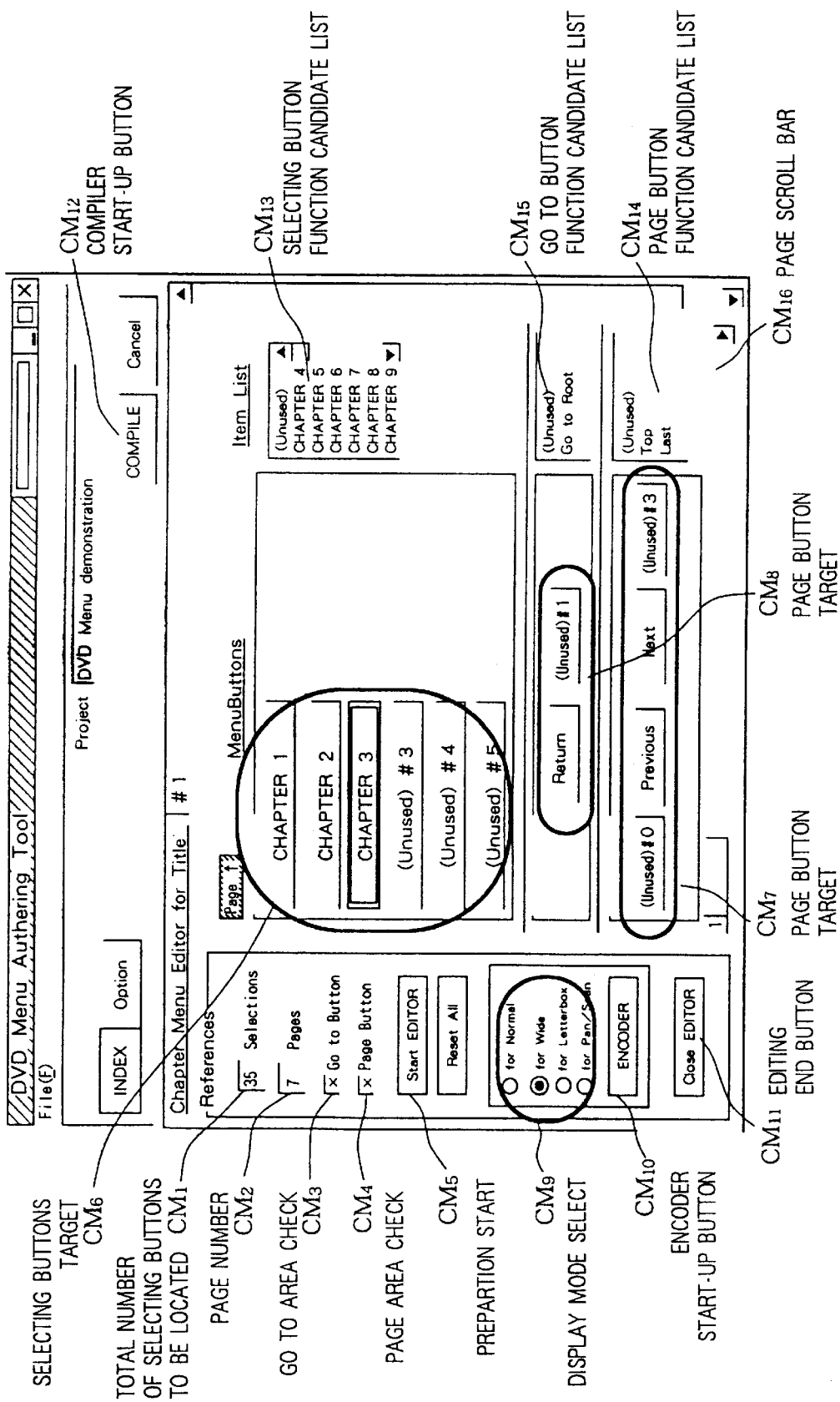
FIG. 10 is a view of a second GUI image for chapter menu editing displayed on the CRT display device of the operation terminal by the microprocessor shown in FIG. 8.

FIG. 10 is a view of a second GUI image for the chapter menu editing displayed on the CRT display device 302 of the operation terminal 300 by the microprocessor 310 shown in FIG. 8.

The chapter menu editing use GUI image shown in FIG. 10 is used by the user for the work for preparing the menu screen data and navigation commands (FIGS. 4A to 4C) of the chapter menu screen and assigning the functions to the operation buttons. Below, the windows (buttons) of the chapter menu editing use GUI image will be explained.

Based on the data input to the chapter menu editing use GUI image, the microprocessor 310 determines the button command BTN_CMD ($N_3$ of FIG. 4C). Further, from the determined button command BTN_CMD ($N_3$ of FIG. 4C), parameters to be stored in the system control use register of the DVD player and the variable storage use register and the initialization rule of these registers are determined. Therefore the microprocessor 310 determines the pre-command PRE_CMD ($N_1$ of FIG. 4A) based on this initialization rule (rule of saving the stream number etc.).

Note that where there is a GO_TO button, the location reproduced immediately before this menu and the audio stream no. etc. (parameters) must be returned to their original states when the RETURN button is depressed. In this case, when the initialization processing for temporarily storing these data as the general parameters of the DVD player is carried out by the PRE_CMD and the button command BTN_CMD is executed, the stored parameters are loaded again.

Below, an explanation will be made of the windows (buttons) and icons of the chapter menu editing use GUI image.

Total number window $CM_1$ of selection buttons to be arranged

The total number of the selection buttons to be arranged on the menu screens, that is, the number designated in the selection button total number window $IM_5$ of the GUI for index input work shown in FIG. 9, is displayed in the selection button total number window $CM_1$.

Page number window $CM_2$

In the page number window $CM_2$, the number designated by the user in the page number display window $IM_4$ of the GUI for the index input work shown in FIG. 9 is displayed.

GO_TO area check window $CM_3$

The GO_TO area is provided on the chapter menu screen and is used as the region in which the operation buttons are arranged for designating whether to pass through that chapter menu screen and display another menu screen or to reproduce the audio and/or video data of the title of a movie etc. A GO_TO area check window $CM_3$ is used by the user for designating whether or not to provide a GO_TO area on the chapter menu screen.

Note that, as an example of the GO_TO area, the menu switching buttons shown in FIG. 3 can be mentioned. In the menu switching buttons shown in FIG. 3, in the GO_TO area, two operation buttons such as "Go to root (return to root menu)" and "Cancel (stop the menu operation and return to the title reproduction)" are placed.

PAGE check area window $CM_4$

The PAGE check area is an area in the chapter menu screen in which the operation buttons used for turning over pages are placed when the menu screen is comprised by a plurality of pages. The chapter menu exemplified in FIG. 10 is comprised by seven pages, therefore the user clicks the PAGE check area window to designates that the PAGE check area is necessary on the chapter menu screen now being prepared.

Preparation start window $CM_5$

When the user clicks the preparation start window $CM_5$, the microprocessor 310 starts the preparation of the display contents of a selection button target window $CM_6$ (all of six shown in FIG. 10), a PAGE button target window $CM_7$, and a GO_TO button target window $CM_8$ (mentioned later) suited to the conditions indicated by the selection button total number window $CM_1$, the page number window $CM_2$, the GO_TO area check window $CM_3$, and the PAGE area check window $CM_4$. Note that the word (Unused) is displayed in the button target to which no function is assigned. The function name is displayed when the function is determined.

Selection button target window $CM_6$

The selection button target window $CM_6$ is used for assigning the functions displayed in the selection button function candidate list window $CM_{13}$ (mentioned later). The microprocessor 310 determines the navigation command to be stored in the button command BTN_CMD ($N_3$ of FIG. 4C) based on the data designated by the user in the selection button target window $CM_6$.

Note that the user can carry out the work of assigning the functions to the icons of the selection button target window $CM_6$ by moving the cursor to the icon of the selection button function candidate list window $CM_{13}$ in which the desired function is displayed, clicking this by the mouse, moving the cursor up to the position of the desired icon of the desired selection button target window $CM_6$ while keeping the button of the mouse depressed, and then releasing the button (drag and drop). The microprocessor 310 displays the function assigned by this operation by the user in the corresponding icon of the selection button target window $CM_6$.

PAGE button target window $CM_7$

The PAGE button target window $CM_7$ is used for assigning the function displayed in the PAGE button function candidate list window $CM_{14}$ (mentioned later). The microprocessor 310 determines the navigation command to be stored in the button command BTN_CMD ($N_3$ of FIG. 4C) based on the data designated in the PAGE button target window $CM_7$ by the user.

Note that the user can carry out the work of assigning functions to icons of the PAGE button target window $CM_7$ by carrying out the drag and drop operation between the icon of the PAGE button function candidate list window $CM_{14}$ in which the desired function is displayed and the desired icon of the PAGE button target window $CM_7$. The microprocessor 310 displays the function assigned by the user in the corresponding icon of the PAGE button target window $CM_7$.

GO_TO button target window $CM_8$

The GO_TO button target window $CM_8$ is used for assigning the functions displayed in the GO_TO button function candidate list $CM_{15}$ (mentioned later). The microprocessor 310 determines the navigation command to be stored in the button command BTN_CMD ($N_3$ of FIG. 4C) based on the data designated in the GO_TO button target window $CM_8$ by the user.

Note that the user can carry out the work of assigning the functions to the icons of the GO_TO button target window $CM_8$ by carrying out the drag and drop operation between the icon of the GO_TO button function candidate list window $CM_{15}$ in which the desired function is displayed and the desired icon of the GO_TO button target window $CM_8$. The microprocessor 310 displays the function assigned by the user in the corresponding icon of the GO_TO button target window $CM_8$.

Due to the restrictions on the configuration of the chapter menu, for example, the number of icons displayed in the selection button target window $CM_6$, the PAGE button target window $CM_7$, and the GO_TO button target window $CM_8$, that is, the number of the operation buttons of the chapter menu screens corresponding to these icons, is restricted to 12 or less in total.

In the chapter menu editing use GUI image exemplified in FIG. 10, six icons in total are placed in the PAGE button target window $CM_7$ and the GO_TO button target window $CM_8$, therefore the number of icons to be placed in the selection button target window $CM_6$ (operation buttons for the chapter selection of the chapter menu screen corresponding to this chapter menu editing use GUI image) becomes six. Further, where no icon is placed in for example the PAGE button target window $CM_7$ and the GO_TO button target window $CM_8$, the number of icons which can be displayed in the selection button target window $CM_6$ becomes 12.

ID codes (0, 1, ..., to (12×page number of menu screen−1)) are assigned to the icons of these button target windows ($CM_6$ to $CM_8$). The microprocessor 310 manages the functions assigned to the icons of the button target windows ($CM_6$ to $CM_8$) from the function candidate lists ($CM_{13}$ to $CM_{15}$) as button commands BTN_CMD ($N_3$ of FIG. 4C) to which these ID codes are attached.

Note that these ID codes are used also in the processing using the data input to a layout/encoder start-up use GUI screen (FIG. 11) mentioned later. The microprocessor 310 manages the data input to the chapter menu editing use GUI screen and the data input to the layout/encoder start-up use GUI screen by the same ID codes and therefore establishes correlation between the button commands BTN_CMD of the operation buttons of the chapter menu screen corresponding to the icons of the button target windows ($CM_6$ to $CM_8$) and the button position data BTN_POSITION and adjacent button data ADJ_BTN input to the layout/encoder start-up use GUI screen ($N_3$, $S_9$ and $S_{10}$ of FIG. 4C) so as to prepare the button information data BTN_INFO ($S_6$ of FIG. 4B).

Further the microprocessor 310 once erases the functions assigned to the icons of the target windows ($CM_6$ to $CM_8$) from the display of the function candidate list windows ($CM_{13}$ to $CM_{15}$). Further, the microprocessor 310 displays the functions rewritten in the icons of the function candidate list windows ($CM_{13}$ to $CM_{15}$) and returned functions when the user rewrites other functions over the functions assigned to the icons of the target windows ($CM_6$ to $CM_8$) or carries out a drag and drop operation by the reverse procedure to that when assigning functions to return the functions assigned to the icons of the target windows ($CM_6$ to $CM_8$) to the icons of the function candidate list windows ($CM_{13}$ to $CM_{15}$).

Further, where all of the functions displayed in the function candidate list windows ($CM_{13}$ to $CM_{15}$) are assigned to the icons of the target windows ($CM_6$ to $CM_8$) of pages of the chapter menu screen and there are no more remaining, all button commands BTN_CMD ($N_3$ of FIG. 4C) which should be written in the program chain PGC (FIG. 4A) of the chapter menu screen being prepared have been determined.

Note that where the total number of the icons of the target windows ($CM_6$ to $CM_8$) is over the total number of all functions displayed in the function candidate list windows ($CM_{13}$ to $CM_{15}$), the microprocessor 310 places data indicating "unused" (UNUSED) for the ID codes corresponding to the icons of the target windows ($CM_6$ to $CM_8$) to which the functions are not assigned.

Encoder start-up button $CM_{10}$

The encoder start-up button $CM_{10}$ is used by the user for calling up the GUI screen used for the actual preparation of the sub-picture data and displaying the same.

Editing ending button $CM_{11}$

The user clicks the editing ending button $CM_{11}$ when finishing all work of preparation of the menu screen being prepared. When the editing ending button $CM_{11}$ is clicked, the microprocessor 310 carries out the compilation processing for the data designated by the user, generates the menu screen data and navigation commands of the menu screens suited to the data structures shown in FIGS. 4A to 4C, records the same in the hard disc drive 320 or the floppy disc drive 322, and ends the menu screen preparation processing.

Compiler start-up button $CM_{12}$

When the user clicks the compiler start-up button $CM_{12}$, the microprocessor 310 carries out the compilation processing for the data designated by the user in the same way as the case where the editing ending button $CM_{11}$ is clicked, generates the menu screen data and navigation commands of the menu screens suited to the data structures shown in FIGS. 4A to 4C, records the same in the hard disc drive 320 or the floppy disc drive 322, and ends the menu screen preparation processing. Note that when the compiler start-up button $CM_{12}$ is clicked, the microprocessor 310 does not end the menu screen preparation processing unlike the case where the editing ending button $CM_{11}$ is clicked.

Selection button function list window $CM_{13}$

In the selection button function list window $CM_{13}$, functions which can be assigned to icons of the selection button target window $CM_6$ (corresponding operation buttons) are displayed in the form of a list. Note that, in the selection button function list window $CM_{13}$, all functions which can be assigned are displayed irrespective of the number of icons of the selection button target window $CM_6$.

GO_TO button function list window $CM_{14}$

In the GO_TO button function list window $CM_{14}$, the functions which can be assigned to the icons of the GO_TO button target window $CM_7$ (corresponding operation buttons) are displayed in the form of a list. Note that, on the chapter menu screen exemplified in FIG. 3, as the functions which can be assigned to the icons of the GO_TO button target window $CM_7$, a function for returning to the root menu screen and a cancelling function for carrying out the reproduction of the audio and/or video data of the title of movie etc. are listed.

PAGE button function list $CM_{15}$

In the PAGE button function list window $CM_{15}$, functions which can be assigned to the icons (corresponding operation buttons) of the PAGE button target window $CM_8$ are displayed in the form of a list. Note that, on the chapter menu screen exemplified in FIG. 3, as the functions which can be assigned to the icons of the PAGE button target window $CM_8$, four functions (to first page(TOP), to previous page (PREVIOUS), to next page(NEXT), and to the last page (LAST)) are listed.

Display mode switching window $CM_9$

The display mode switching window $CM_9$ is used by the user for designating to make the chapter menu screen a wide screen, a letterbox, or a pan scan when the DVD bit stream is for a 16:9 screen. Note that, when the user depresses the encoder start-up button $CM_9$, the microprocessor 310 refers to the information designated in the display mode switching window $CM_8$.

Page scroll bar $CM_{16}$

When the chapter menu screen is over a plurality of pages, this is used by the user for displaying the GUI screen of another page.

Contents of work with espect to chapter menu editing use GUI image and processing of same Below, an explanation will be made of the data inputting work carried out by the user with respect to the chapter menu editing use GUI image and the contents of the processing carried out by the microprocessor 310 based on the designated data by taking as an example the case where the chapter menu image shown in FIG. 3 is prepared.

For example, when the user designates the total number of the selection buttons as 35 in the selection button total number window $IM_5$ of the index inputting work use GUI image (FIG. 9) and designates the page number as seven pages in the page number display window $IM_4$, the microprocessor 310 displays the number 35 in the selection button total number window $CM_1$ of the chapter menu editing use GUI image and displays the number 7 in the page number window $CM_2$ (Step 2-1 (S2-1)).

On the chapter menu screen exemplified in FIG. 3, as the menu switching buttons, two buttons such as "Go to root" and "Cancel (stop the menu operation and carry out the reproduction of audio and/or video data of the title of movie etc.)" are provided. Therefore the user clicks the GO_TO area check window $CM_3$ by the mouse to check it (Step 2-2 (S2-2)).

Further, since the chapter menu image exemplified in FIG. 3 is comprised by seven pages, the user clicks the PAGE check area window $CM_4$ by the mouse to check it (Step 2-3 (S2-3)).

When the above works (S2-2 and S2-3) are ended, the user clicks the preparation start window $CM_5$ by the mouse. The microprocessor 310 determines the number of icons of the selection button target window $CM_6$ as six per page from the information designated in the work of S2-1 and S2-2, determines the number of icons of the GO_TO button target window $CM_8$ as two per page, determines the number of icons of the PAGE button target window $CM_7$ as four per page, and displays these icons in the selection button target window $CM_6$. the PAGE button target window $CM_7$, and the GO_TO button target window $CM_8$, respectively.

Further, since the total number of the selection buttons designated in the selection button total number window $CM_1$ (selection button total number window $IM_5$ (FIG. 9)) is 35, the microprocessor 310 determines the words to be displayed in the selection button function candidate list window $CM_{13}$ as "Chapter 1" to "Chapter 35" and displays the same in the icons of the selection button function candidate list window $CM_{13}$. Similarly, the microprocessor 310 displays the words indicating two types of functions in the GO_TO button function candidate list window $CM_{15}$ and displays the words indicating the two types of functions in the PAGE button function candidate list window $CM_{14}$ (Step 2-4 (S2-4)).

The user carries out the drag and drop operation as mentioned above between the icon displayed as "Chapter 1" among the icons of the selection button function candidate list window $CM_{13}$ and the icon displayed on the top of the selection button target window $CM_6$ to assign "Chapter 1" as the function to the top icon of the selection button target window $CM_6$. The microprocessor 310 writes the navigation command for jumping to "Chapter 1" as the button command BTN_CMD ($N_3$ of FIG. 4C) according to this assignment by the user and stores the same in the memory 312.

Below, similarly, the user carries out the drag and drop operation between icons of the selection button function candidate list window $CM_{13}$ and the selection button target window $CM_6$ and the microprocessor 310 assigns the functions to the icons of the selection button function candidate list window $CM_{13}$ according to the operation of the user and writes the navigation commands of the button command BTN_CMD of the ID codes. Note that FIG. 10 shows a chapter menu editing use GUI image of a stage of assignment of a function for jumping to "Chapter 3" in the window of the selection button target window $CM_6$.

Further, similarly, the user carries out the drag and drop operation between icons of the GO_TO button function candidate list window $CM_{15}$ and the GO_TO button target window $CM_8$ and further between the icons of the PAGE button function candidate list window $CM_{14}$ and the PAGE button target window $CM_7$ to assign functions to the icons of the GO_TO button target window $CM_8$ and the PAGE button target window $CM_7$. The microprocessor 310 assigns the functions to the icons of the GO_TO button target window $CM_8$ and the PAGE button target window $CM_7$ according to the operation of the user and writes the navigation commands of the button commands BTN_CMD of the ID codes of pages and stores the same in the memory 312.

Note that, in the chapter menu editing use GUI image exemplified in FIG. 10, since the user has checked the GO_TO area check window $CM_3$, not only the navigation command indicating the jump to the chapters (JUMP), but also the navigation command for setting the parameter written in the post-command POST_CMD ($N_2$ of FIG. 4A) are used (Step 2-5 (S2-5)).

When the assignment of functions to the operation buttons (icons of the target windows $CM_6$ to $CM_8$) and the writing of the navigation commands by the user and the microprocessor 310 are ended, the operation routine proceeds to the layout of the operation buttons to be actually displayed on the chapter menu screen reproduced by the DVD player and the preparation of the sub-picture pixel data of the chapter menu screen.

It is necessary to prepare three types of chapter menu screens respectively suited to a wide screen, a letterbox screen, and a pan scan screen, therefore, the user first clicks the icon designating the wide screen (for Wide) to designate the generation of a sub-picture suited to a DVD video stream for a wide screen of 16:9 (Step 2-6 (S2-6)).

When the user clicks the encode start-up button $CM_{10}$, the microprocessor 310 displays the GUI image used for the actual preparation of the sub-picture data (button layout use GUI image mentioned later (FIG. 11)) on the CRT display device 302 and proceeds to the processings of S3-1 to S3-10 (Step 2-7 (S2-7)).

When the preparation of the chapter menu screen for the wide screen is ended, the user and the microprocessor 310 repeat the work and processings of S3-1 to S3-10 so as to respectively prepare the chapter menu screens for the letterbox and pan scan.

That is, the user clicks the icon displayed as the letterbox (for Letterbox) of the display mode switching window $CM_9$ and the encode start-up button $CM_{10}$ to prepare the chapter menu screen for the letterbox, and further clicks the icon displayed as the pan scan (for Pan scan) and the encode start-up button $CM_{10}$ to prepare the chapter menu screen for the pan scan (Step 2-8 (S2-8)).

When the preparation of one chapter menu screen is completed and the user clicks the editing ending button $CM_{11}$, the microprocessor 310 compiles all navigation commands concerning the chapter menu generated from the data designated by the user and records the same in the hard disc drive 320 or the floppy disc drive 322 in the format adapted to the program chain PGC (FIGS. 4A to 4C) (Step 2-9 (S2-9)).

Where there is a menu screen which should be further prepared, the user and the microprocessor 310 return to the work and processing of S1-5 mentioned above (Step 2-10 (S2-10)).

Button layout use GUI image

Figure 11:
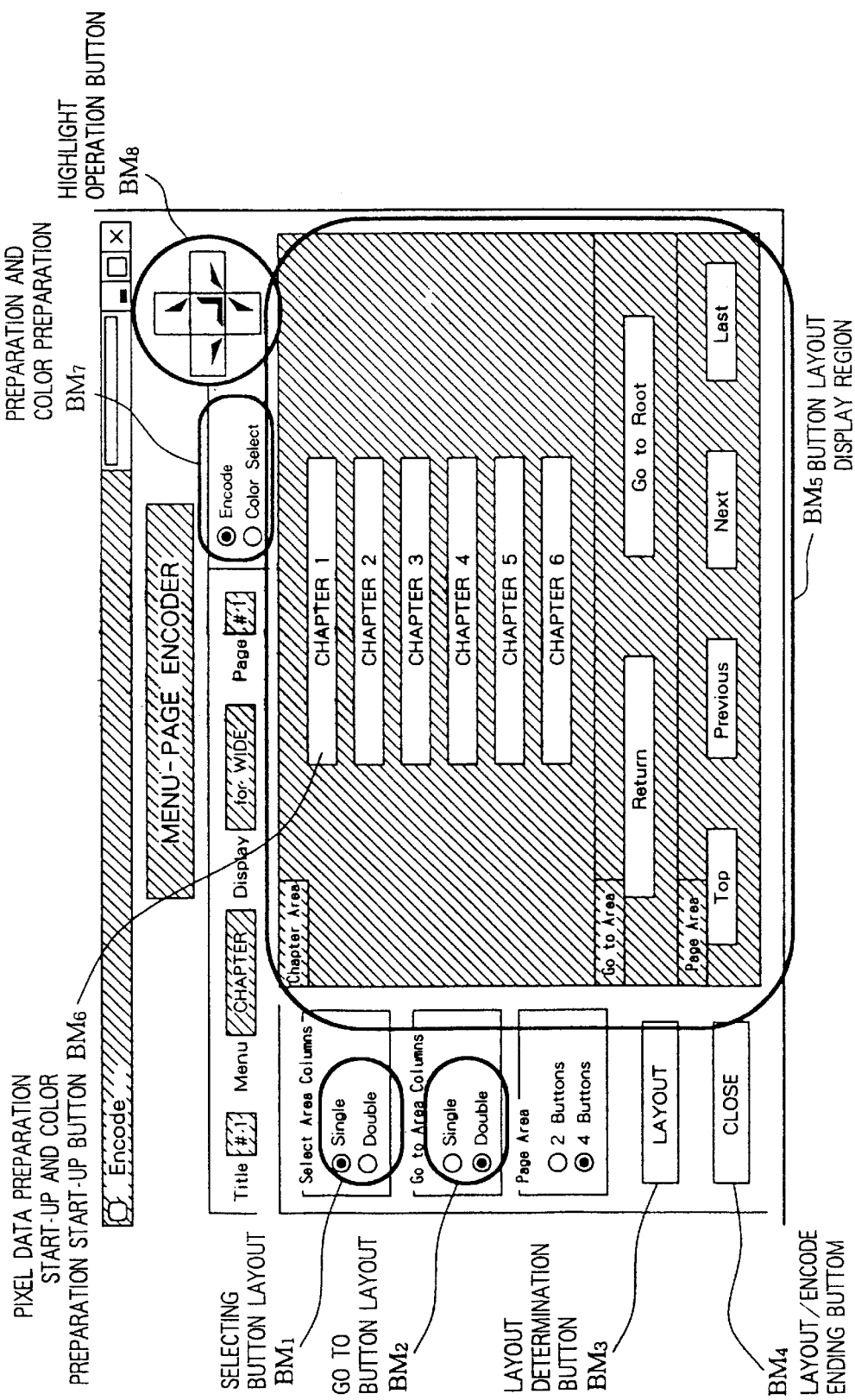
FIG. 11 is a view of a third GUI image for button layout displayed on the CRT display device of the operation terminal by the microprocessor shown in FIG. 8.

FIG. 11 is a view of a third GUI image for button layout displayed on the CRT display device 302 of the operation terminal 300 by the microprocessor 310 shown in FIG. 8.

The button layout use GUI image shown in FIG. 11 is used for the actual layout of the operation buttons on the DVD player reproduction screen and the preparation work of the pixel data of the sub-picture for display (sub-picture data). The microprocessor 310 (FIG. 8) prepares two types of data for the menu screen (button position data BTN_POSITION ($S_9$) shown in FIG. 4C and adjacent button data ADJ_BTN ($S_{10}$)) based on the data designated by the user in the button layout use GUI image. A button information data BTN_INFO is generated from these data prepared by using the button layout use GUI image and the button command BTN_CMDN$_3$ prepared by the work and processings of above S2-1 and subsequent steps. Below, an explanation will be made of the windows (buttons) of the button layout use GUI image.

Below, the windows (buttons) and icons of the button layout use GUI image will be explained.

Selection button layout window $BM_1$

The selection button layout window $BM_1$ is used by the user for designating whether the selection buttons used for selecting the chapters on the chapter menu screen (six in total in the button layout use GUI image exemplified in FIG. 11) should be arranged in one vertical column or two vertical columns. The microprocessor 310 changes the arrangement of the selection buttons of the button layout display region $BM_5$ in accordance with the designation of the user. That is, when the user clicks the icon (Single) indicating the single vertical column display of the selection button layout $BM_1$ and further clicks the layout determination button $BM_3$ mentioned later, the microprocessor 310 displays six selection buttons in a single vertical column in the button layout display region $BM_5$. When the user clicks the icon (Double) indicating the two vertical column display and further clicks the layout determination button $BM_3$, the microprocessor 310 displays three selection buttons each in two vertical columns in the button layout display region $BM_5$.

GO_TO button layout window $BM_2$

The GO_TO button layout window $BM_2$ is used by the user for designating whether the selection buttons (GO_TO button (two in total in the button layout use GUI image exemplified in FIG. 11)) used for stopping the menu selection operation and returning to the reproduction of the video data of the title of the movie etc. should be arranged in one vertical column or two vertical columns on the chapter menu screen. The microprocessor 310 changes the arrangement of the selection buttons of the button layout display region $BM_5$ in accordance with the designation of the user and the clicking of the layout determination button $BM_3$ similar to the case of the designation of the selection button layout window $BM_1$.

Note that the layout of the selection buttons (PAGE buttons) used for the selection of the menu screen is always one lateral row, therefore in the button layout use GUI image exemplified in FIG. 11, there is no window used for designating the arrangement of the PAGE buttons.

Layout determination button $BM_3$

The layout determination button $BM_3$ is clicked when the user ends the designation with respect to the selection button layout window $BM_1$ and the GO_TO button layout window $BM_2$. When the button layout display region $BM_5$ is clicked, the microprocessor 310 automatically generates the sub-picture data in which selection buttons are actually arranged on the chapter menu screen and displays the same in the selection button total number window $IM_5$ based on the designation of the user as mentioned above, the number of the selection buttons designated with respect to the selection button total target window $IM_5$, etc.

Layout/encoder ending button $BM_4$

The layout/encoder ending button $BM_4$ is clicked when the user ends the operation with respect to the button layout use GUI image. When the layout/encoder ending button $BM_4$ is clicked, the microprocessor 310 generates the button position data BTN_POSITION and the adjacent button data ADJ_BTN ($S_9$ and $S_{10}$ of FIG. 4C) based on the information designated from the user with respect to the button layout use GUI image, combines these data and the button command BTN_CMD ($N_3$ of FIG. 4C) generated by the operation and processing with respect to the chapter menu editing use GUI image, and generates the button information data BTN_INFO ($S_6$ of FIG. 4C).

Further, the microprocessor 310 generates the highlight color data ($S_5$ of FIG. 4B) from the selection color data SELECT_COLOR and the action color data ACTION_COLOR ($S_7$ and $S_8$ of FIG. 4C) generated by the work and processings of S4-1 to S4-4 and S5-1 to S5-3 mentioned later.

Further, the microprocessor 310 writes the generated highlight color data and button information data BTN_INFO in the program chain PGC (FIGS. 4A to 4C).

Button layout-display region $BNM_5$

In the button layout display region $BM_5$, operation buttons of the chapter menu screen (pixel data preparation start-up, color preparation start-up button $BM_6$, etc. mentioned later) generated by the microprocessor 310 are arranged in the actual positional relationship.

Pixel data preparation start-up and color preparation start-up button $BM_6$

A pixel data preparation start-up and color preparation start-up button $BM_6$ is displayed in the form of an icon in the button layout display region $BM_5$. When the user clicks a pixel data preparation start-up and color preparation start-up button $BM_6$, the microprocessor 310 displays the pixel data conversion use GUI screen (FIG. 12) or the button/highlight color editing use GUI (FIG. 13) mentioned later on the CRT display device 302 and proceeds to the work and processings of the pixel data conversion or button/highlight color editing shown in S4-1 and S5-1 and subsequent steps.

Note that, on the pixel data preparation start-up and color preparation start-up button $BM_6$, words indicating the functions assigned to the selection buttons by the work and processings of S2-1 and subsequent steps are retrieved for every ID code and written, therefore the user can prepare the sub-picture data while directly confirming both of the position and function of appearance.

Pixel data-preparation start-up and color preperation start-up buttons $BM_7$

The pixel data preparation start-up and color preparation start-up buttons $BM_7$ are used by the user for indicating to the microprocessor 310 which of the pixel data conversion use GUI screen or the button/highlight color editing use GUI is to be displayed and which of the pixel data conversion processing or the button/highlight color editing processing is to be started up. The microprocessor 310 carries out the screen display and processing according to the designation of the user with respect to the pixel data preparation start-up and color preparation start-up buttons $BM_7$.

Highlight operation buttons $BM_8$

The highlight operation buttons $BM_8$ are used by the user for displaying the chapter menu screen using the highlight color data ($S_5$ of FIG. 4B) determined in the processings of S5-1 to S5-3 and confirming the highlight color of the operation buttons. When a highlight operation button $BM_8$ is clicked, the microprocessor 310 controls the sub-picture encoder 330 (FIG. 8) and makes it generate the sub-picture data of the menu screen using an actual highlight color data and display the same on the monitor device 332. Note that the remote controller of the DVD player has a cursor key and an execution key. The selection use highlight is displayed in accordance with the cursor key input, and the execution use highlight is displayed in accordance with the input of the execution key. In this way, the highlight operation buttons $BM_8$ have the function of changing the selection and determining the operation buttons by the cursor key and the execution key provided in the remote controller. The function of the DVD player can be simulated by using the highlight operation buttons $BM_8$.

Contents of work with respect to button layout use GUI image and processing of same Below, an explanation will be made of the data inputting work carried out by the user with respect to the button layout use GUI image and contents of the button layout processing and the encoding processing carried out by the microprocessor 310 based on the designated data by taking as an example the case where the chapter menu image shown in FIG. 3 is prepared.

The user clicks either of the icons in the selection button layout window $BM_1$ to designate whether the selection buttons used for the selection of the chapter should be arranged in one vertical column or two vertical columns. Note that, FIG. 11 shows the button layout use GUI image when the user designates a single vertical column display (Step 3-1 (S3-1)).

The user designates whether the GO_TO buttons should be arranged in one vertical column or two vertical columns in the GO_TO button layout window $BM_2$. Note that, FIG. 11 shows the button layout use GUI image when the user designates a two vertical column display (Step 3-2 (S3-2)).

When the user clicks the layout determination button $BM_3$, the microprocessor 310 changes and displays the selection buttons for the chapter selection and the GO_TO buttons in the button layout display region $BM_5$ according to the designation of the user in the work of S3-1 and S-2.

Further, the positional relationship of the selection buttons is clarified at this point of time, therefore the microprocessor 310 finds the button position data BTN_POSITION and the adjacent button data ADJ_BTN ($S_9$ and $S_{10}$ of FIG. 4C) corresponding to the ID codes of buttons and stores the same in the memory 312 (Step 3-3 (S3-3)).

When the user clicks the pixel data preparation processing button (Encode) of the pixel data preparation start-up and color preparation start-up buttons $BM_7$ and selects the pixel data preparation processing, the microprocessor 310 starts up the pixel data preparation processing of the operation buttons (selection buttons) and displays the pixel data conversion use GUI screen (FIG. 12) on the CRT display device 302. The user and the microprocessor 310 proceed to the work and processings of S4-1 to S4-4 for preparing the sub-picture data of selection button corresponding to the ID code 0 (Step 3-4 (S3-4)).

The user and the microprocessor 310 successively click the icons of the button layout display region $BM_5$ and repeat the work and processings of S4-1 to S4-4 until the generation of the sub-picture data of all selection buttons is completed (Step 3-5 (S3-5)).

Next, when the user clicks the color preparation processing button (Color Select) of the pixel data preparation start-up and color preparation start-up buttons $BM_7$ to select the color data preparation processing, the microprocessor 310 starts up the color data preparation processing and displays the button/highlight color editing use GUI (FIG. 13) used for the preparation of the selection button color for the chapter selection and the highlight color on the CRT display device 302. Further, the user and the microprocessor 310 proceed to the work and the processings of S5-1 to S5-3 (Step 3-6 (S3-6)).

Further, the user and the microprocessor 310 repeat the work and the processings of preparing the GO_TO button and PAGE button colors and highlight color (Step 3-7 (S3-7)).

The user clicks a highlight operation button $BM_8$ to display the sub-picture data of the menu screen using the access unit ACCESS_UNIT ($S_1$ of FIG. 4A) generated by the processings of S5-1 to S5-3 on the monitor device 332 and confirms the color of the operation button and the highlight color when reproduced by the actual DVD player. Where there is a problem in these colors, the user and the microprocessor 310 return to the work and processing of S3-6 or S3-8 (Step 3-8 (S3-8)).

When the user clicks the layout/encoder ending button $BM_4$, the microprocessor 310 generates the button position data BTN_POSITION and the adjacent button data ADJ_BTN corresponding to the ID codes of the operation buttons ($S_9$ and $S_{10}$ of FIG. 4C) and prepare the button information data BTN_INFO from these data and the button command BTN_CMD ($N_3$ of FIG. 4C) generated in the processings of S2-1 to S2-10.

Further, the microprocessor 310 writes the generated button information data BTN_INFO and the highlight color data ($S_5$ of FIG. 4B) generated by the work and processings of S4-1 to S4-4 in the program chain PGC (FIGS. 4A to 4C) and ends the display of the button layout use GUI image and the layout processing and the encoding processing (Step 3-9 (S3-9)).

The user and the microprocessor 310 return to the work and processing of S2-8 (Step 3-10 (S3-10)).

Pixel data conversion use GUI screen

Figure 12:
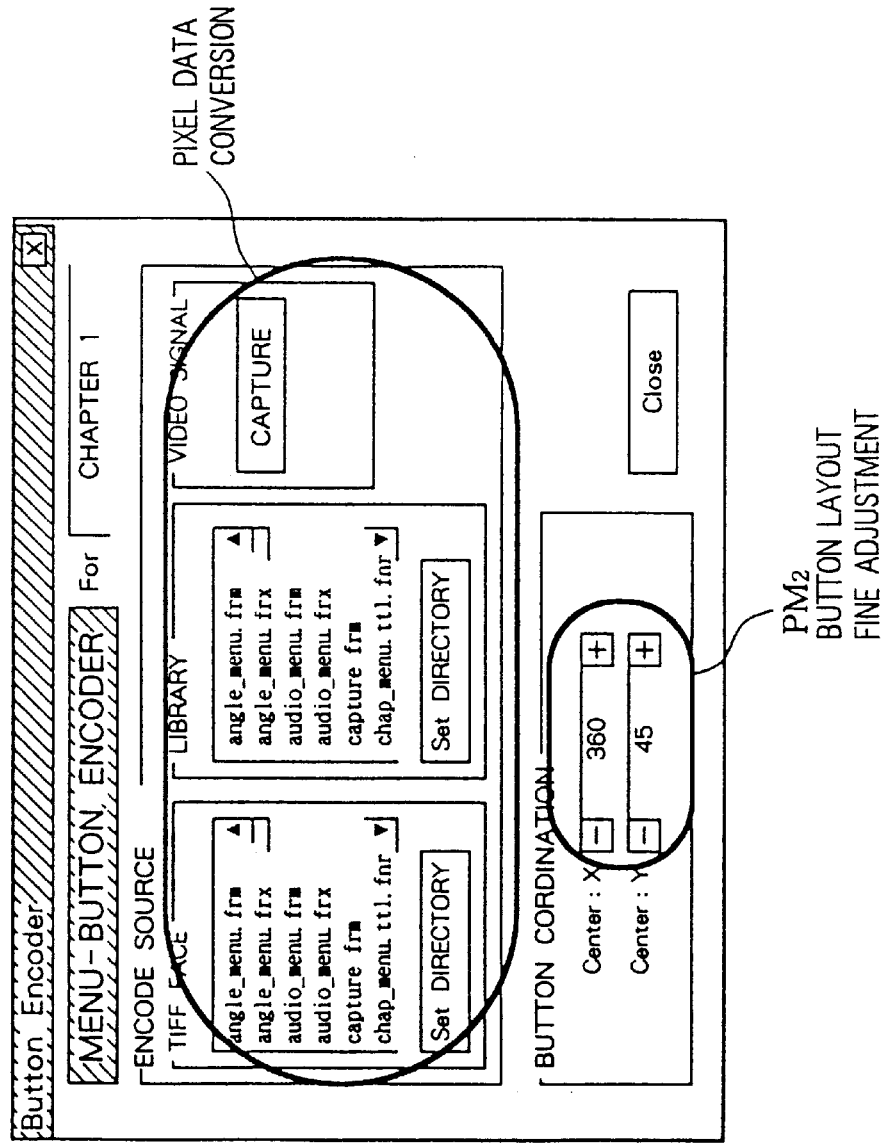
FIG. 12 is a view of a fourth GUI image for pixel data conversion displayed on the CRT display device of the operation terminal by the microprocessor shown in FIG. 8.

FIG. 12 is a view of a fourth GUI image for the pixel data conversion displayed on the CRT display device 302 of the operation terminal 300 by the microprocessor 310 shown in FIG. 8.

The pixel data conversion use GUI screen shown in FIG. 12 is used for completing the final sub-picture data after the user prepares the sub-picture data (pixel data) of individual operation buttons, combines the same with the sub-picture data of the chapter menu thereof prepared by the wors and the processings heretofore, displays the same on the monitor device 332, indicates this to the user, and has the user confirm the contents of the sub-picture data. Below, an explanation will be made of the windows (buttons) of the pixel data conversion use GUI screen.

Pixel data conversion window $PM_1$

The pixel data conversion window $PM_1$ is used for designating the source data for generating the sub-picture data (pixel data) by the user.

As the source data for generating the sub-picture data (pixel data), video data of a TIFF format (one type of format for fetching video into a computer—not subject to quantization) which can be prepared by a general computer or previously prepared video data called up from a video data library can be used. Further, the sub-picture data can be directly obtained by encoding the video data by the sub-picture encoder 2 (FIG. 5) or the picture encoder 330 (FIG. 8).

Button layout fine adjustment window $PM_2$

The button layout fine adjustment window $PM_2$ is used by the user for confirming the contents of the sub-picture data which are actually generated and displayed on the monitor device 332 and finely adjusting the position of the operation buttons.

Contents of work with respect to pixel data conversion use GUI screen and-processing of same Below, an explanation will be made of the data inputting work carried out by the user with respect to the pixel data conversion use GUI screen and the contents of the processing carried out by the microprocessor 310 based on the designated data by taking as an example the case where the chapter menu image shown in FIG. 3 is prepared.

When the user designates one of the above three types of video data as the source data of the sub-picture data in the pixel data conversion window $PM_1$, the microprocessor 310 controls the sub-picture encoder 330 to make it generate the sub-picture data (pixel data) from the designated video data. Note that, as shown in FIG. 1, as an initial value of the sub-picture data, the number 0 is given with respect to the data of pixels of all regions. Whenever the data of one operation button is generated, for example, the number shown in FIG. 2 is given to the pixel of the region in which the operation button exists (Step 4-1 (S4-1)).

When the user changes the number by clicking a "+" button or a "−" button by using the mouse of the input portion 304 (FIG. 8) to move the position of the lever of the button layout fine adjustment window $PM_2$, the microprocessor 310 changes the sub-picture data to correct the position of the operation button and displays the sub-picture data after correction on the monitor device 332 via the sub-picture encoder 330. By these work and processings, the user carries out the work with respect to the button layout fine adjustment window $PM_2$ while viewing the display of the monitor device 332 so can finely adjust the position of the operation button (Step 4-2 (S4-2)).

The microprocessor 310 combine the sub-picture data prepared by the work and processings of S4-1 and S4-2 and the sub-picture data of the other parts prepared up to this point of time and stores the same in the sub-picture pixel data ($S_3$ of FIG. 4B) of the program chain PGC (FIGS. 4A to 4C).

The user and the microprocessor 310 return to the work and processing of S3-5 (Step 4-4 (S4-4)).

Button/highlight color editing use GUI

Figure 13:
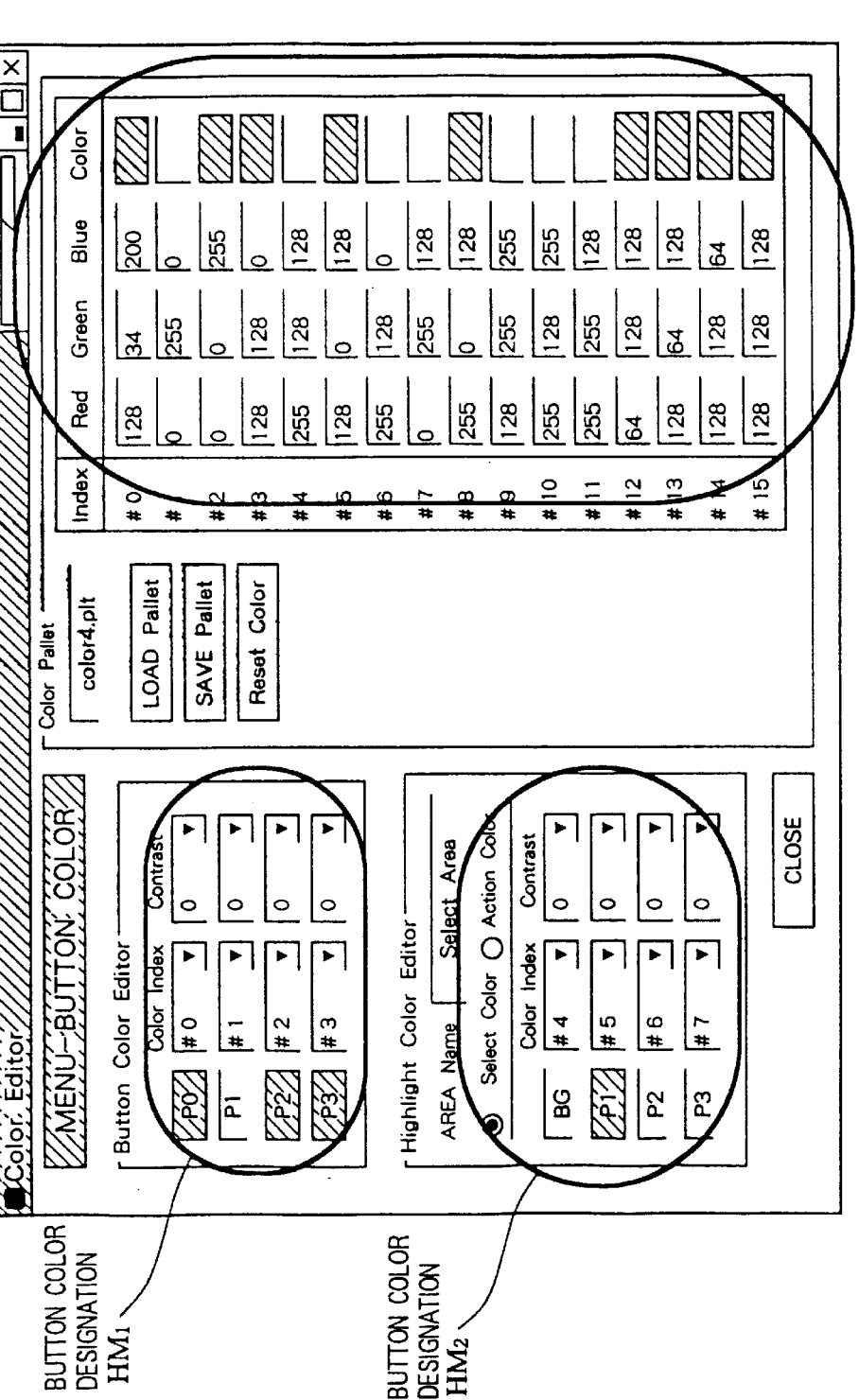
FIG. 13 is a view of a fifth GUI image for button/highlight color editing displayed on the CRT display device of the operation terminal by the microprocessor shown in FIG. 8.

FIG. 13 is a view of a fifth GUI image for the button/highlight color editing to be displayed on the CRT display device 302 of the operation terminal 310 by the microprocessor 310 shown in FIG. 8.

The GUI screen for the button/highlight color editing shown in FIG. 13 is used to prepare the color for the time of nonselection of individual operation buttons and the highlight color for the time of their selection, combine the same with the sub-picture data (pixel data) prepared by the work and processings heretofore, and display the same on the monitor device 332 (FIG. 8) and is used by the user for confirming the content of the sub-picture data displayed on the monitor device 332 and generating the button color data BTN_COLOR and the action color data ACTION_COLOR ($S_4$ of FIG. 4B and $S_8$ of FIG. 4C) by the microprocessor 310. Below, an explanation will be made of the windows (buttons) of the button/highlight color editing use GUI.

Button color designation window $HM_1$

A button color designation window $HM_1$ is used by the user to select four colors from the color palette $HM_3$, establish correspondence with the numbers 0 to 3 (00 to 11) assigned to pixels of the sub-picture shown in FIG. 1, respectively, designate the color of all operation buttons at the time of nonselection, and designate the value of the ratio (contrast; coefficient k, (1−k)) for superimposing the background video and the sub-picture data in 16 stages.

Highlight color designation window $HM_2$

There are two types of highlight color at the time of selection of an operation button: the highlight at the time of selection of a button and the highlight at the time of execution of the button. The highlight color designation window $HM_2$ is used by the user to respectively assign four colors among the colors contained in the color palette $IM_3$ to the values of the pixel data (0 to 3) assigned to the pixels of the sub-picture shown in FIG. 1 for the operation buttons and designate how the color of an operation button should change between the time of the selection of the button and the time of execution of the button, and designate the contrast between the background video and the sub-picture data at the time of highlight of each.

Color palette $IM_3$

On the color palette $HM_3$, for example, 16 types of color data (RGB data) are displayed. It is used by the user to designate any color among the 16 colors for the button color designation window $HM_1$ and the highlight color designation window $HM_2$.

Contents of work with respect to button/highlight color editing use GUI image and processing of same Below, an explanation will be made of the data inputting work carried out by the user with respect to the button/highlight color editing use GUI and the contents of the button/highlight editing processing carried out by the microprocessor 310 based on the designated data by taking as an example the case where the chapter menu image shown in FIG. 3 is prepared.

The user designates the button color in the button color designation window $HM_1$. The microprocessor 310 generates the button color data BTN_COLOR ($S_4$ of FIG. 4B) in accordance with the designation of the user and writes the same in the program chain PGC (FIGS. 4A to 4C) (Step 5-1 (S5-1)).

The user designates the highlight color in the highlight color designation window $HM_2$. The microprocessor 310 generates the selection color data SELECT_COLOR and the action color data ACTION_COLOR ($S_7$ and $S_8$ of FIG. 4C) in accordance with the designation of the user and writes the same in the program chain PGC (FIGS. 4A to 4C). Note that, the selection color data SELECT_COLOR and the action color data ACTION_COLOR are designated for each of the three types of the selection buttons for the chapter selection, the GO_TO buttons, and the PAGE buttons (Step 5-2 (S5-2)).

The user and the microprocessor 310 then return to the work and the processing of S3-7 (Step 5-3 (S5-3)).

Operation of DVD recording apparatus 1

Figure 14:
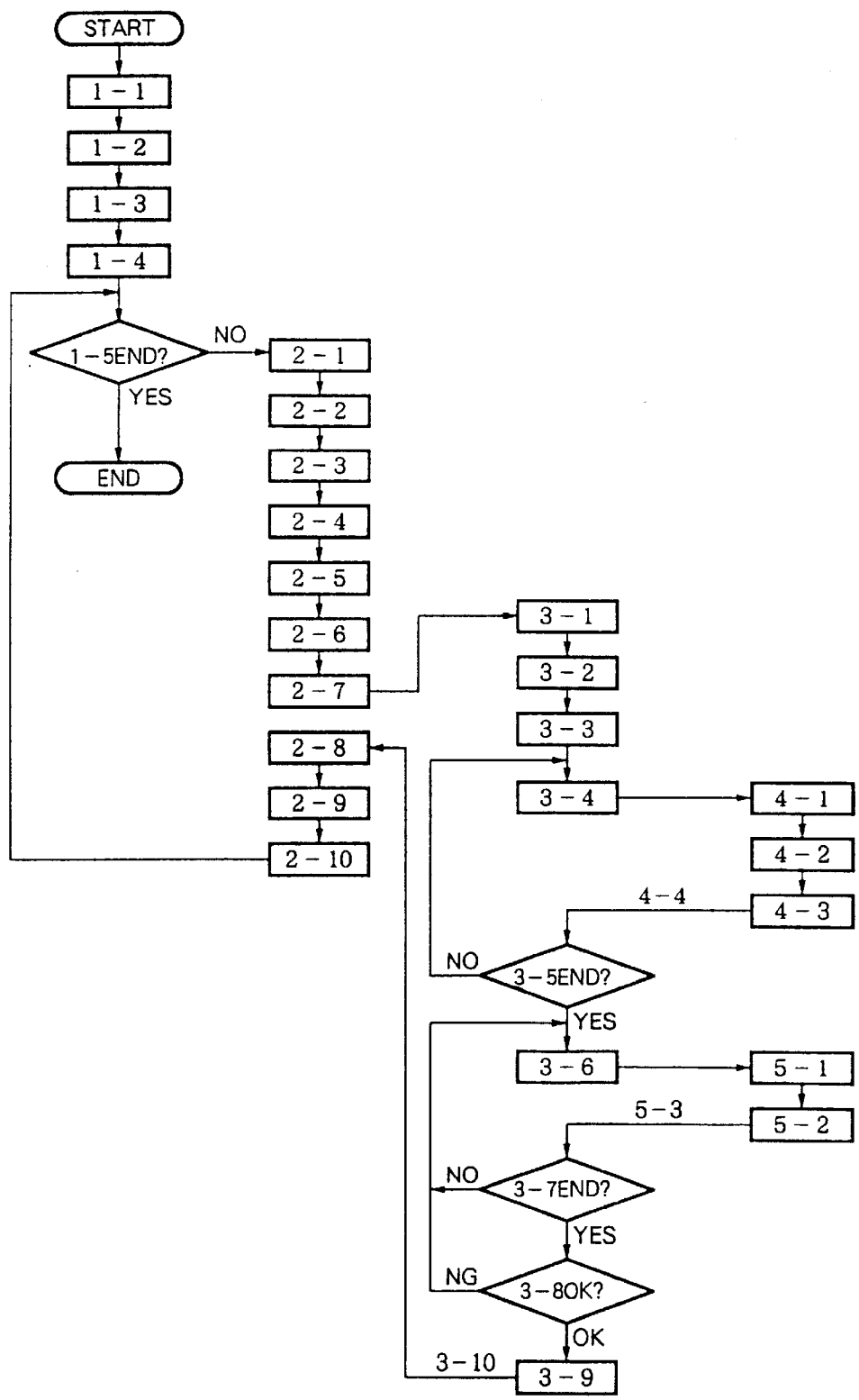
FIG. 14 is a flowchart of the menu preparation work carriLed out by using the GUI screens shown in FIG. 9 to FIG. 13 and the processing of the same.

FIG. 14 is a flowchart of the menu preparation work carried out by using each GUI screen shown in FIG. 9 to FIG. 13 and the processing of the same. Note that the reference symbols of FIG. 14 correspond to the work and the processings of the user and the microprocessor 310 given the same symbols.

Figure 15:
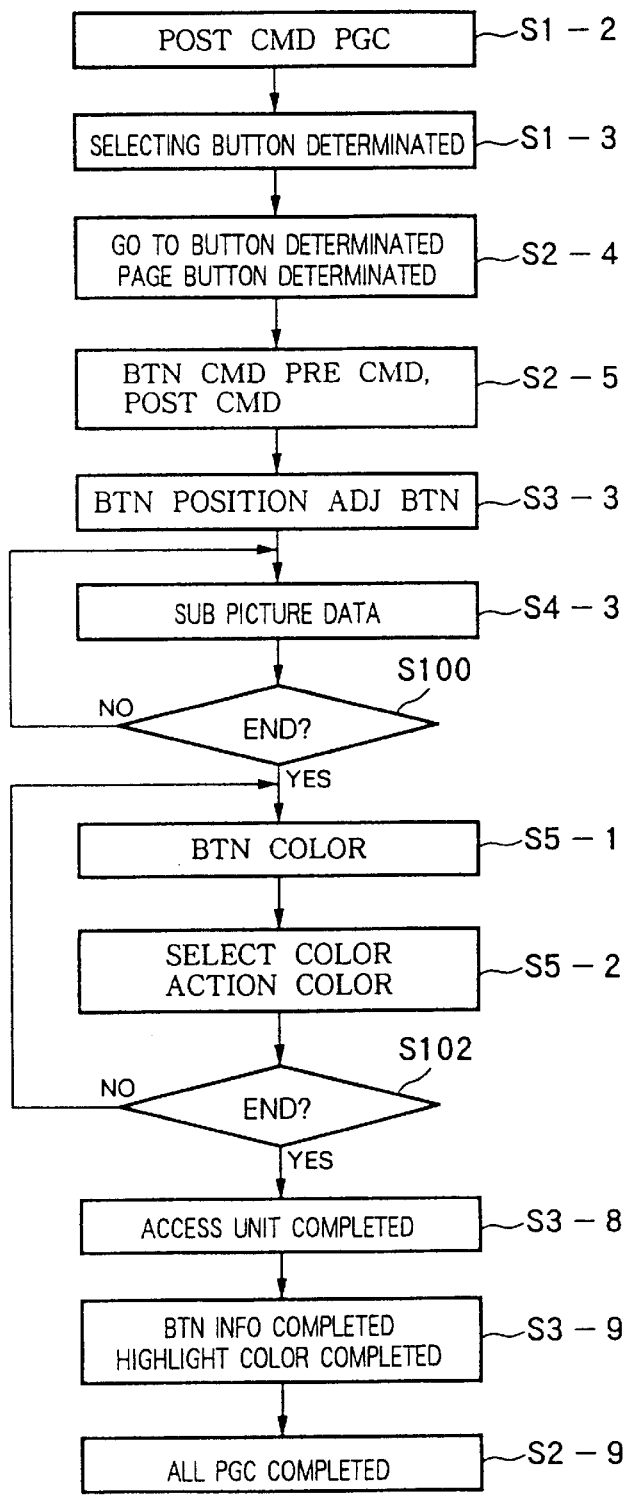
FIG. 15 is a flowchart of the menu preparation work carried out by using the GUI screens shown in FIG. 9 to FIG. 13 and the basic processing of the same.

FIG. 15 is a flowchart of the basics of the menu preparation work carried out by using each GUI screen shown in FIG. 9 to FIG. 13 and the processing of the same. Note that, in FIG. 15, for the simplification of the explanation, only the main processings among the processings shown in FIG. 14 (FIG. 9 to FIG. 13) are shown. The reference symbols of S1-2 to S5-2 correspond to the work and processings of the user and the microprocessor 310 given the same symbols.

Below, the basics of the operation of the DVD recording apparatus will be mainly explained by referring to FIG. 15.

First, the user carries out the inter-active operation with respect to the menu preparation portion 3 to prepares the navigation data, menu screen data, and the sub-picture data.

As shown in the processing of S1-2 in FIG. 15, the user inputs the number of pages of each menu screen to the page number display window (FIG. 9) of each menu screen. The microprocessor 310 determines the menu screen of the destination of branch to be written in the post-command POST_CMD of the root menu based on the relationship between the root menu and the other menu screens and stores the same in the memory 312.

In the work and processing of S1-3, the user designates the total number of the selection buttons of each menu screen in the selection button total number window $IM_5$. The functions and purposes of the selection buttons are specified by the characteristic feature of the menu screen, therefore the microprocessor 310 determines the candidates of the button command BTN_CMD ($N_3$ of FIG. 4C) and stores the same in the memory 312.

In the work and processing of S2-4, the user clicks the preparation start window $CM_5$ (FIG. 10) by the mouse after the end of the work and processings of S2-2 and S2-3 mentioned above. The microprocessor 310 determines the number of icons of the selection button target window $CM_6$ and the GO_TO button target window $CM_8$, and the number of icons of the PAGE button target window $CM_7$ from the information designated in the work of S2-1 and S2-2 and respectively displays them in the target windows $CM_5$ to $CM_8$. Further, the microprocessor 310 determines the words to be displayed in the function candidate list windows $CM_{13}$ to $CM_{15}$ and displays the same.

In the work and processing of S2-5, the user carries out a drag and drop operation between icons of the function candidate list windows $CM_{13}$ to $CM_{15}$ and the target windows $CM_6$ to $CM_8$ to assign functions to the icons of the target windows $CM_6$ to $CM_8$. The microprocessor 310 writes the button command BTN_CMD ($N_3$ of FIG. 4C) of each ID code according to this assignment by the user and stores the same in the memory 312.

In the work and processing of S3-3, when the user clicks the layout determination button $BM_3$, the microprocessor 310 changes the selection buttons for the chapter selection and the GO_TO buttons in the button layout display region $BM_5$ according to the designation of the user in the work of S3-1 and S3-2 mentioned above and displays the same.

Further, the microprocessor 310 finds the button position data BTN_POSITION and adjacent button data ADJ_BTN ($S_9$ and $S_{10}$ of FIG. 4C) corresponding to the ID codes of the buttons and stores them in the memory 312.

In the work and processing of S4-3, the microprocessor 310 combines the sub-picture data prepared by the work and processings of S4-1 and S4-2 mentioned above and the sub-picture data of the other parts prepared up to this point of time and stores the same in the sub-picture pixel data ($S_3$ of FIG. 4B) of the program chain PGC (FIGS. 4A to 4C) (Step 4-3 (S4-3)).

In the work and processing of S100, the user or the microprocessor 310 decides whether or not the preparation of the sub-picture data of all menu screens has been ended. Where it is not ended, it proceeds to the work and processing of S4-3, while where it is ended, proceeds to the work and processing of S5-1.

In the work and processing of S5-1, the user designates the button color in the button color designation window $HM_1$. The microprocessor 310 generates the button color data BTN_COLOR ($S_4$ of FIG. 4B) in accordance with the designation of the user and writes the same in the program chain PGC (FIGS. 4A and 4C) (Step 5-1 (S5-1))

In the work and processing of S5-2, the user designates the highlight color in the highlight color designation window $HM_2$. The microprocessor 310 generates the selection color data SELECT_COLOR and the action color data ACTION_COLOR ($S_7$ and $S_8$ of FIG. 4C) in accordance with the designation of the user and writes the same in the program chain PGC (FIGS. 4A and 4C).

In the processing of S102, the user or the microprocessor 310 decides whether or not the work and processings of S5-1 and S5-2 have been ended. Where they are not ended, it proceeds to the work and processing of S5-1, while where they are ended, proceeds to the work and processing of S3-8.

In the work and processing of S3-8, the user clicks the highlight operation button $BM_8$, makes the monitor device 332 display the sub-picture data of the menu screen using the access unit ACCESS_UNIT ($S_1$ of FIG. 4A) generated by the processings of S5-1 to S5-3, and confirms the color of the operation button and the highlight color where they are reproduced by the actual DVD player. Where there is a problem in these colors, the user and the microprocessor 310 return to the work and processing of S3-6 or S3-8.

In the work and processing of S3-9, when the user clicks the layout/encoder ending button $BM_4$, the microprocessor 310 generates the button position data BTN_POSITION and the adjacent button data ADJ_BTN corresponding to the ID codes of the operation buttons ($S_9$ and $S_{10}$ of FIG. 4C) and prepares the button information data BTN_INFO from these data and the button command BTN_CMD ($N_3$ of FIG. 4C) prepared by the processings of S2-1 to S2-10.

Further, the microprocessor 310 writes the generated button information data BTN_INFO and highlight color data ($S_5$ of FIG. 4B) generated by the work and processings of S4-1 to S4-4 in the program chain PGC (FIGS. 4A and 4C) and ends the display of the button layout use GUI image and the layout processing and encoding processing.

In the work and processing of S2-9, when the user clicks the editing ending button $CM_{11}$, the microprocessor 310 compiles all navigation commands concerning the chapter menu generated from the data designated by the user and records the same in the hard disc drive 320 or the floppy disc drive 322 in a format suited to the program chain PGC (FIGS. 4A and 4C) (Step 2-9 (S2-9)). Note that, after the ending of the processing of S2-9, the operation routine returns to the work and processing S1-5 shown in FIG. 14.

The video encoder 100 (FIG. 5) compresses and encodes the noncompressed moving picture video data input from the VTR apparatus or the like by the MPEG2 system under the control of the multiplex control portion 104 to generate the main picture.

The audio encoder 102 compresses and encodes the noncompressed audio data input from the VTR apparatus to generate the compressed audio data.

The sub-picture encoder 2 quantizes the input video data and encodes the same to generate the sub-picture data.

The multiplexing portion 106 multiplexes the compressed video data (main picture) and compressed audio data respectively input to the input terminals a and b and the sub-picture data etc. input from the sub-picture encoder 2 to the input terminal c or the sub-picture data etc. generated by the menu preparation portion 3 explained by referring to FIG. 9 to FIG. 15 and input to the input terminal d so as to generate the DVD bit stream.

The recording device 108 records the DVD bit stream input from the multiplexing portion 106 on the DVD.

As explained in the first embodiment above, by the DVD recording apparatus 1 according to the present invention, even when an editor does not have specialized knowledge about the navigation commands of the DVD video disc standard, he can prepare the navigation commands and various menu screens.

Further, by the DVD recording apparatus 1 according to the present invention, the editor can confirm the contents of the sub-picture data where the editor actually reproduces the same by the DVD player in the preparation stage and can prepare the sub-picture data while simulating the change of the color at the selection and nonselection of the operation buttons of the various menu screens.

Note that, the DVD recording apparatus 1 shown in the first embodiment can not only be applied to the DVD system menus, but can also be expanded to the assignment of the button functions of S2-1 to S2-10 mentioned above and can be used for the preparation of the user operation screens of all inter-active DVD software.

Further, the DVD recording apparatus 1 shown in the first embodiment can not only be applied to the processing of the sub-picture data, but also general still picture video data by expanding the processings of S4-1 to S4-4 and S5-1 to S5-3 mentioned above. Accordingly, by using the DVD recording apparatus 1, it is possible to not only generate a DVD bit stream, but also prepare the user interface of general inter-active software.

Second Embodiment

Below, as a second embodiment, an explanation will be made of the method of preparation of the navigation commands of multi-title multi-audio software among the software (inter-active software) of the inter-active reproduction mode (multi-story multi-ending) of the DVD video disc standard using the DVD recording apparatus 1 shown in FIG. 5.

Note that, in the second embodiment, while an explanation will be made by taking as an example the preparation of the navigation commands of inter-active software, the method of generating the navigation commands of the software for other special reproduction, for example, the software for the multi-angle reproduction mode, is similar.

Summary of inter-active software

Inter-active software, as explained above, means audio and/or video data which are edited so as to be give a viewer a choice at every juncture of the story at the time of reproduction and changes the way the story plays out after the juncture in accordance with the choice of the viewer. It is recorded on for example the DVD 110.

That is, for example, the viewer can select either of the parts $B_1$ and $B_2$ as the part to be reproduced next and reproduce the same on the DVD player (not illustrated) by using the remote controller to carry out an operation on the menu screen displayed on the screen at the end of the reproduction of the first part A of the inter-active software and further can select either of the parts $C_1$ and $C_2$ ($C_3$ and $C_4$) as the part to be reproduced next to these parts and reproduce the same by carrying out the operation at the end of the reproduction of the part $B_1$ ($B_2$).

Note that, below, the part which is selected by the operation of the user with respect to the menu and becomes the unit of the reproduction in the inter-active software like each of these parts $A_1$ to $C_4$ will be called a reproduction unit and a plurality of reproduction units which have the same attribute, and can be handled as one group at the reproduction, for example parts $B_1$ and $B_2$ ($C_1$ to $C_4$) will be called a reproduction group.

Configuration of inter-active software

Below, the configuration of the inter-active software will be explained.

FIGS. 16A to 16C are views of the reproduction processing of the inter-active software.

The inter-active software is comprised by the above reproduction units (reproduction groups), control commands (navigation commands) used for the control for connection and reproduction processing (FIG. 16A) for successively reproducing a plurality of reproduction units (reproduction groups), branch processing (FIG. 16B) for reproducing the reproduction unit matching the branch conditions among a plurality of reproduction units, connection and branch processing (FIG. 16C) for combining the connection processing and branch processing, etc., and the reproduction control data including the sub-picture data etc. of the menu screen.

Figure 17:
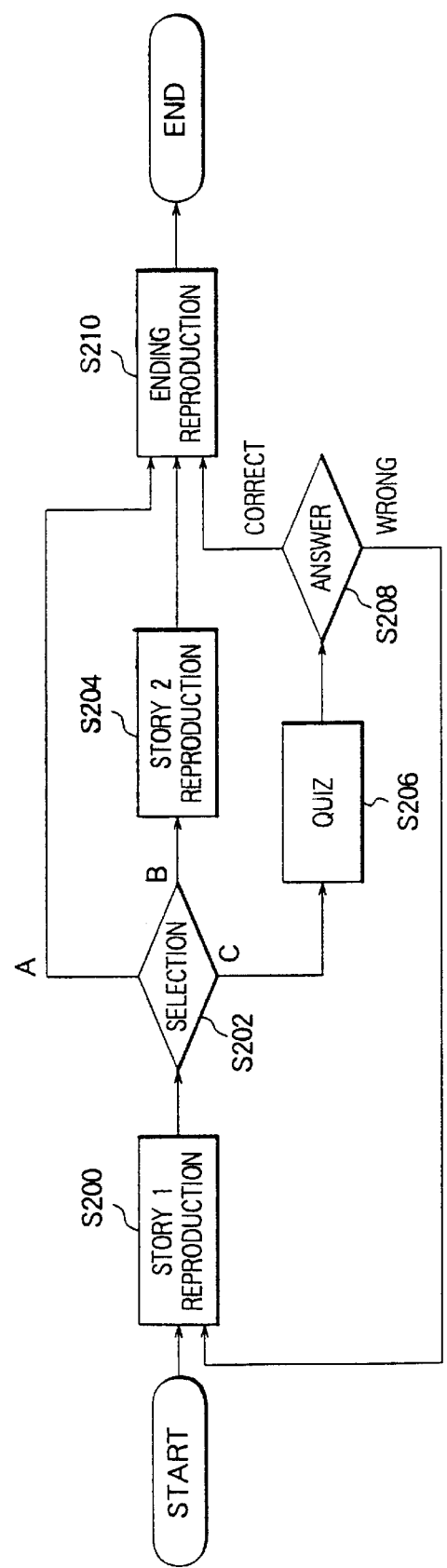
FIG. 17 is a flowchart of an example of the reproduction processing of the inter-active software.

FIG. 17 is a flowchart of an example of the reproduction processing of the inter-active software.

For example, concretely, the inter-active software is comprised as follows.

The inter-active software is comprised as shown in for example FIG. 17. That is, the first reproduction unit (story 1) of the inter-active software is reproduced (S200).

When the reproduction of the story 1 is ended, the first selection menu is displayed (S202) and one of the next reproduction units (ending (S210), story 2 (S204), and quiz (S206)) is reproduced in accordance with the choices A to C selected by the viewer.

In the processing of S202, when the viewer selects the choice C, the menu indicating the choice of the answer is displayed (S208). When the answer of the viewer is correct, the ending is displayed. When it is incorrect, the operation returns to the reproduction of the story 1 (S200).

The program for making the DVD player execute the reproduction processing exemplified in FIG. 17 contains the command for storage of the numbers for an internal variable and a system variable, a data reading command, an operation command, a jump/branch command, etc. and is written by navigation commands resembling those of a general program language.

Summary of method of preparation of navigation commands

The method of preparation of navigation commands according to the present invention shown as the second embodiment comprises the microprocessor 310 (FIG. 8) of the menu preparation portion 3 (FIG. 5 etc.) displaying a status transition indicating a transition from the status of reproducing a certain reproduction unit to a status of reproducing that reproduction unit or another reproduction unit on the CRT display device 302, the editor (user) of the inter-active software selecting a desired navigation command in the displayed status transition, and the microprocessor 310 automatically preparing the navigation command corresponding to the status transition selected by the user.

Specifically, the microprocessor 310 realizes the method of preparation of a navigation command according to the present invention explained below.

In the first stage, the microprocessor 310 divides the inter-active software which is input by the user from the input portion 304 and is the object of the reproduction processing in the DVD player into reproduction regions based on the data indicating the range, attributes, etc. of each of the reproduction units and the reproduction groups (hereinafter, also referred to as the reproduction regions).

Figure 18:
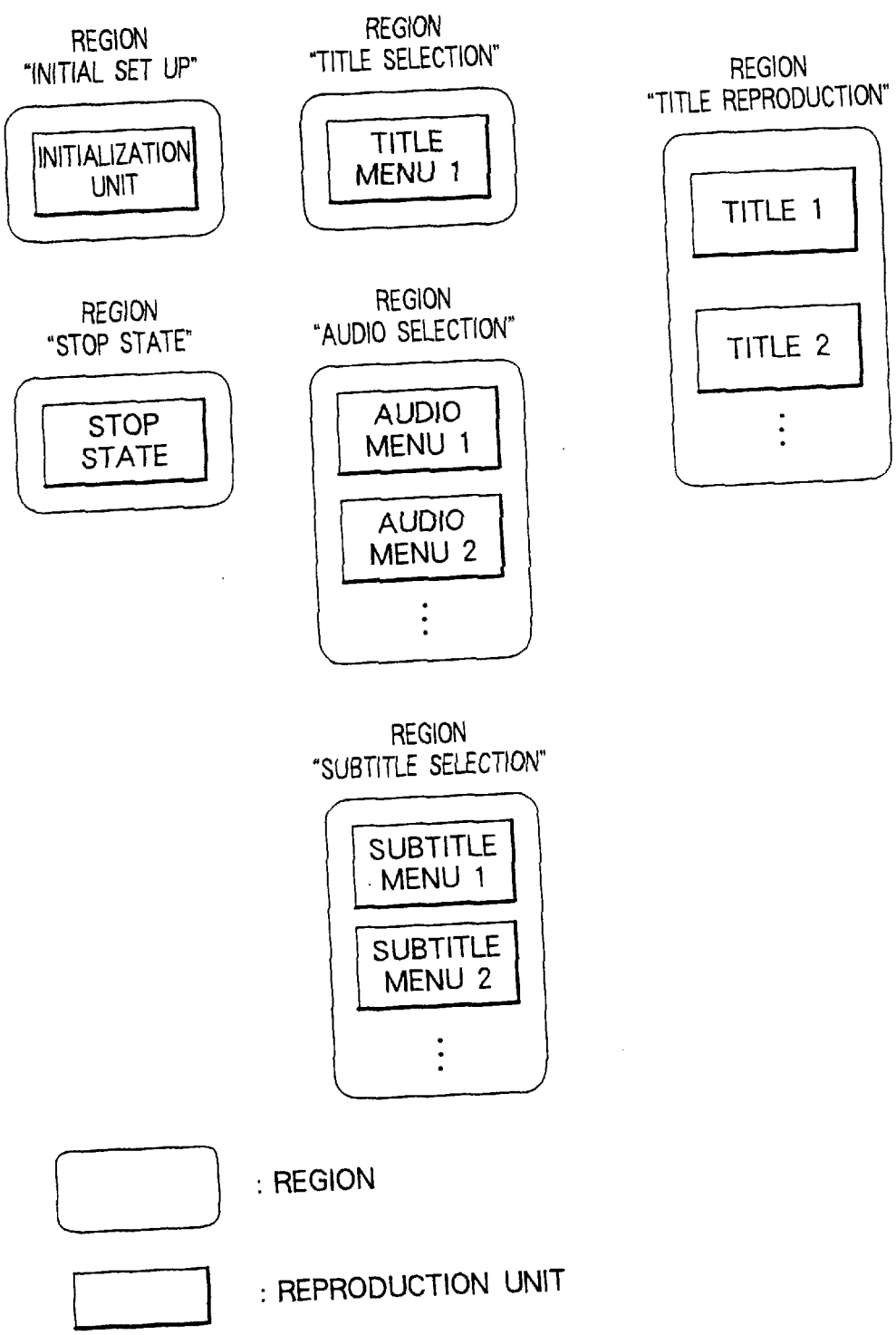
FIG. 18 is a view of examples of a reproduction unit and reproduction group (reproduction region)

FIG. 18 is a view of examples of the reproduction units and reproduction groups (reproduction regions).

The inter-active software of the configuration shown in FIG. 17 is concretely divided into for example, as shown in FIG. 18, the regions "initial set up", "stop state", "title selection (region indicating title menu)", "audio selection (region used for selecting one of a plurality of dubbed languages)", "subtitle selection (region used for selecting one of the subtitles in a plurality of languages)", and "title reproduction (region for reproducing one of a plurality of titles of movies etc.)"

In the next stage, the microprocessor 310 extracts all of the status transitions which can be caused between the reproduction regions, for example, the status transition of change from the region "initial set up" to the region "subtitle selection" or the status of change from the region "audio selection" to the region "title reproduction" and displays the same on the CRT display device 302 by drawing lines expressing the transition between the reproduction regions shown in for example FIG. 18 as selection options.

In the next stage, the microprocessor 310 generates the basic processing unit (command unit) containing one or more navigation commands used for realizing these transition processings based on an algorithm corresponding to the extracted status transition as shown in for example FIG. 17.

In the next stage, the microprocessor 310 selects the status transition in accordance with the selection operation by the user of clicking for example the lines respectively expressing the status transitions on the display screen of the CRT display device 302 by the mouse.

Finally, the microprocessor 310 combines the command units corresponding to the status transition selected by the user and generates the list of the programs written by the navigation commands.

Specific contents of method of preparation of navigation commands

Below, the specific contents of the method of preparation of navigation commands according to the present invention will be explained by taking as an example a case where the navigation commands of multi-title multi-audio software recording the video data of a plurality of titles of movies etc. on one recording medium (DVD) and further recording a plurality of audio data for every title is prepared.

Among the inter-active software, one recording the video data of a plurality of titles of movies etc. on one recording medium (DVD) and further recording a plurality of audio data for every title will be referred to as multi-title multi-audio software.

As a concrete example of the multi-title multi-audio software, there can be mentioned software obtained by providing audio data of both Japanese and English for the video data of two movies (titles) on one DVD. Note that a title no. is attached to each of the series of video data of a plurality of titles of the multi-title multi-audio software, and an audio stream no. is attached to each of the plurality of series of audio data.

Menu screen of multi-title multi-audio software

Figure 19A:
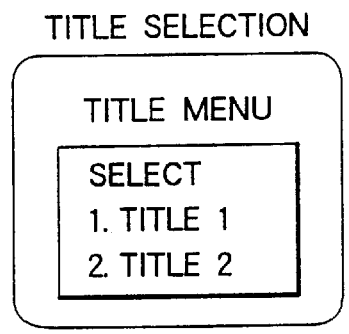
FIGS. 19A to 19C are views of examples of the menu screen of a multi-title multi-audio software.
Figure 19B:
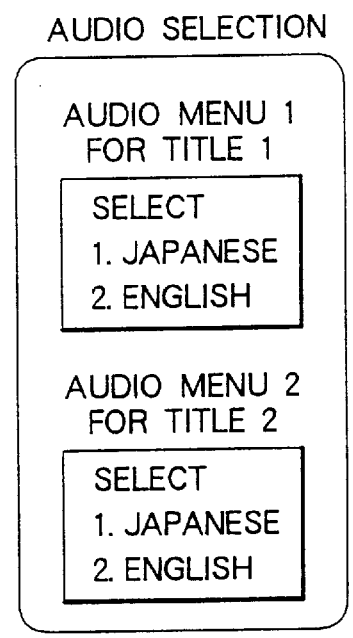
Figure 19C:
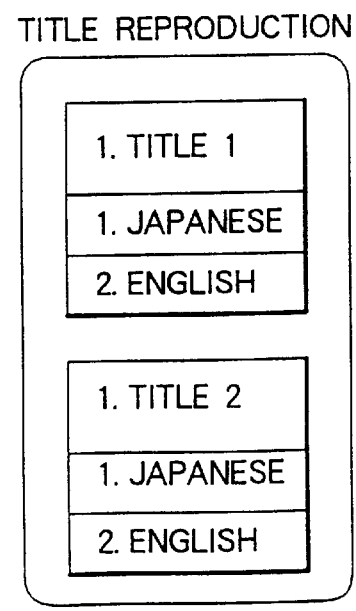

FIGS. 19A to 19C are views of examples of the menu screen of the multi-title multi-audio software.

The multi-title multi-audio software corresponding to the menu screen of FIGS. 19A to 19C contains the audio of the titles of two movies etc. As the audio data, Japanese audio data and English audio data are contained as the reproduction units.

As shown in FIG. 19A, in the window of the title menu of this multi-title multi-audio software, icons given the names of the titles of the two movies etc. (title 1 and title 2) are displayed.

Further, as shown in FIG. 19B, in the audio menu, windows given the names of the two audio streams (audio menu 1 for title 1 and audio menu 2 for title 1) are displayed. Icons displaying the selectable language (Japanese and English) are displayed in each window.

Further, in the two windows of the title menu, icons given the names of titles (title 1 and title 2) and selectable languages (Japanese and English) are displayed.

Reproduction region of multi-title multi-audio software

FIG. 20 is a table indicating the reproduction units and reproduction groups (reproduction regions) contained in the multi-title multi-audio software shown in FIGS. 19A to 19C.

Note that, as shown in FIG. 20, the multi-title multi-audio software corresponding to the menu screen shown in FIGS. 19A to 19C can be divided into the title menu, audio menu 1 for title 1, audio menu 2 for title 2, title 1, and title 2 as the reproduction units. The reproduction unit "Title menu" comprises the reproduction group "Title selection", the reproduction units "Audio menu 1 for title 1" and "Audio menu 2 for title 2" comprise the "Audio selection" of the reproduction group, and the reproduction units "Title 1" and "Title 2" comprise the reproduction group "Title reproduction".

Register configuration, operation, and specifications of DVD player

FIG. 21A is a view of the system register for storing the set values of the DVD player; and FIG. 21B is a view showing a general register.

FIG. 22 is a table of examples of the operation of the DVD player for reproducing the multi-title multi-audio software corresponding to the menu screen shown in FIGS. 19A to 19C.

FIG. 23 is a table of examples of the specifications of the DVD player for reproducing the multi-title multi-audio software corresponding to the menu screen shown in FIGS. 19A to 19C.

Note that only the parts of the register configuration, operation, and specifications of the DVD player respectively shown in FIGS. 21A and 21B, FIG. 22, and FIG. 23 relating to the explanation of the method of preparation of navigation commands according to the present invention are shown for illustration and simplification of illustration.

The DVD player for reproducing the multi-title multi-audio software corresponding to the menu screens shown in FIGS. 19A to 19C has a system register for storing the set values thereof and a general register for temporarily storing the operation results etc. as respectively shown in for example FIGS. 21A and 21B.

Further, as shown in FIG. 22, the DVD player for reproducing the multi-title multi-audio software corresponding to the menu screens shown in FIGS. 19A to 19C displays the title selection use menu screen (FIG. 19A) when the reproduction region "Title menu" is to be processed for reproduction and further carries out the operation of storing the title no. obtained in accordance with the operation with respect to this title menu screen by the user at the address 4 of the system register shown in FIG. 21A.

Further, where the reproduction region "Audio menu" is to be processed for reproduction, this DVD player displays the audio selection use menu screen of each title shown in FIG. 19B and further carries out the operation of storing the title no. obtained in accordance with the operation with respect to this audio selection use menu screen by the user at the address 1 of the system register shown in FIG. 21A.

Further, where the reproduction region "Title reproduction" is to be processed for reproduction, this DVD player displays up to 99 titles on the title reproduction use menu screen shown in FIG. 19C and carries out the operation of selecting and outputting the audio data corresponding to the audio stream no. stored at the address 1 of the system register shown in FIG. 21A corresponding to each of the titles.

Further, as shown in FIG. 23, the DVD player for reproducing the multi-title multi-audio software corresponding to the menu screen shown in FIG. 19A cannot compare the data stored in the system register (FIG. 21A) and the direct values when executing the comparison command in the reproduction processing and cannot decide whether for example the value of the data stored in the No. 1 position of the system register is larger than the number 5.

Further, in this DVD player, after the end of reproduction of the reproduction region "Audio menu", direct reproduction of the reproduction region "Title menu" (status transition from "Audio menu" to "Title menu"; Jump) is possible.

Further, the reproduction of the menu screen of each reproduction region in the audio menu cannot be directly carried out after reproducing the other reproduction region. Direct reproduction of the menu for each title is possible in only the reproduction region "Audio menu".

Further, after the end of the reproduction of the other reproduction region, direct reproduction of the reproduction region "Title reproduction menu" (jump to "Title reproduction menu") is possible.

Extraction of status transition

FIG. 24 is a table indicating the status transitions of the multi-title multi-audio software corresponding to the menu screens shown in FIGS. 19A and 19B.

Based on the configuration of the reproduction regions shown in FIG. 20 to FIG. 23 and the operation and specifications of the DVD player, the microprocessor 310 directly extracts the reproduction units "Title 1" and "Title 2" of the reproduction group "Title reproduction" and the reproduction group "Audio selection" as the reproduction units which can be reproduced after the end of the reproduction of the reproduction unit "Title menu" of the reproduction group "Title selection" as shown in FIG. 24.

Further, the microprocessor 310 similarly directly extracts the reproduction units "Title 1" and "Title 2" of the reproduction group "Title reproduction" as the status transition of the reproduction unit which can be reproduced after the ending of the reproduction of each reproduction unit "Audio menu" of the reproduction group "Audio selection".

The relationships among these extracted reproduction regions are displayed in a table indicating the status transitions or the CRT display device 302 as a graphic obtained by drawing lines between statuses by the microprocessor 310 to be indicated to the user.

Generation of command unit

FIG. 25 is a first table indicating the command units corresponding to the status transition of the reproduction group "Title selection" shown in FIG. 24.

When extracting the status transition shown in FIG. 24, the microprocessor 310 establishes correspondence between functions corresponding to the status transitions of all reproduction groups "Title selection" which can exist (reproduction processings of titles of title nos. 1 to 99 (Jump to the title of the title number 1 to Jump to the title of the title number 99) and the reproduction processing of the audio menu (Jump to audio menu)), command units (J1 to J100), and command words of navigation commands (Jump_TT1 to Jump_TT99, Jump_Audio) as shown in FIG. 25.

FIG. 26 is a second table indicating the command units corresponding to the reproduction group "Audio selection" shown in FIG. 24.

Further, similarly, the microprocessor 310 establishes correspondence between functions corresponding to the status transitions of all reproduction groups "Audio selection" which can exist (Jump to the title of the title number 1 to Jump to the title of the title number 99, Jump to audio menu 1 to Jump to audio menu 99, store the value of the system register at the address 0 of the general register, error processing, and two branch processings), command units (J1 to J107, F1, F2, B1, B2), and command words of navigation commands (Jump-TT1 to Jump_TT99, Jump_AudioMenu1 to Jump_AudioMenu8, Mov_SR4_GR0, Exit, EQ_CR0_1, EQ_CR0_2) as shown in FIG. 26.

FIG. 27 is a view of examples of the status transition selected by the user (FIG. 24).

The user decides on which the status transitions (FIG. 24) expressed in the form of a table or form of graphics on the CRT display device 302 to use for the multi-title multi-audio software and selects the status transition shown in FIG. 27 by designation of the same on the display screen by the mouse.

The microprocessor 310 selects the status transition shown in FIG. 27 in accordance with the operation of selection of the status transition by the user.

Figures 28A, 28B:
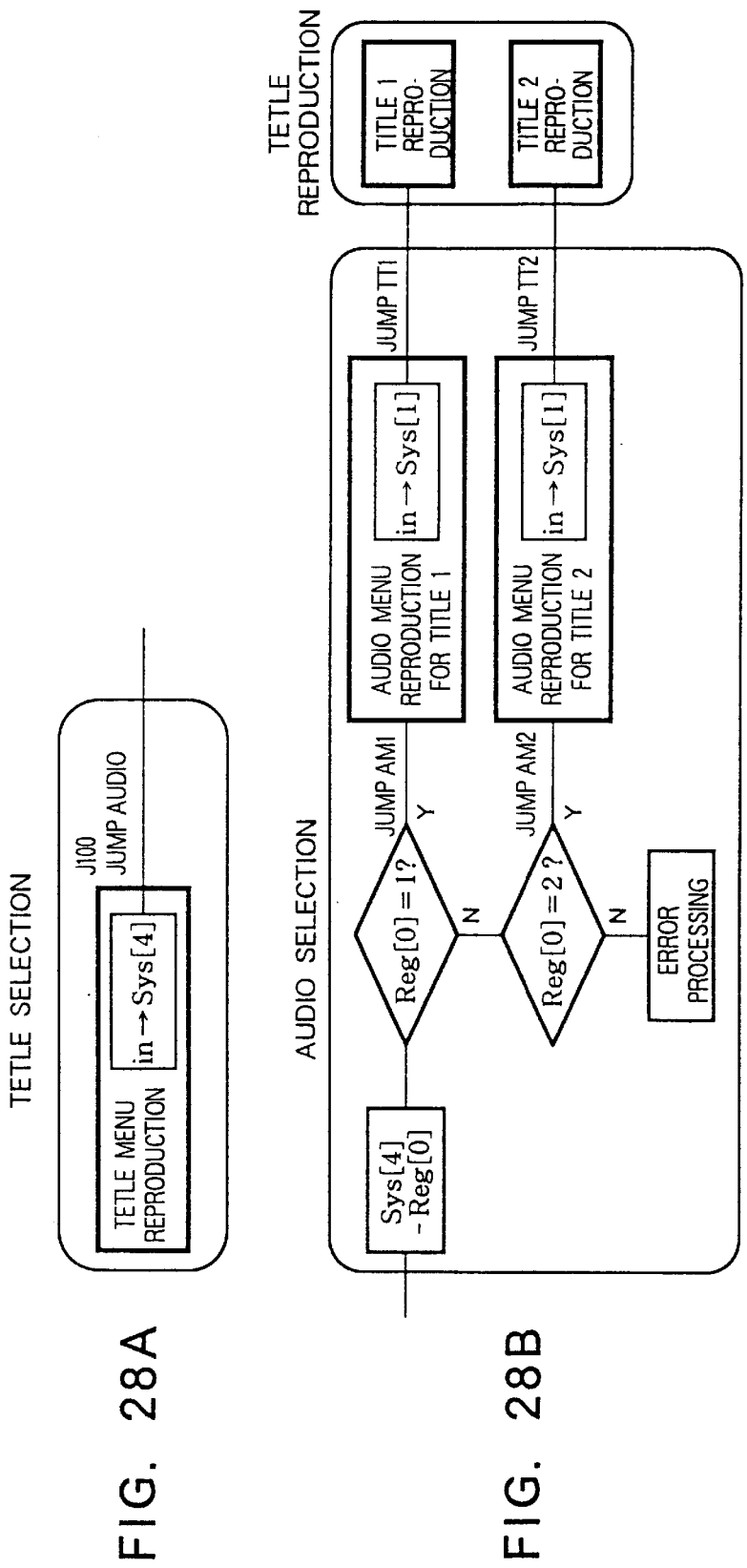
FIGS. 28A and 28B are flowcharts of the reproduction processing derived from the status transition selected by the user.
Figure 29A:
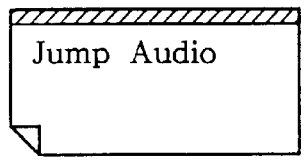
FIGS. 29A to 29D are views of the command units (navigation commands) generated based on the selected status transition (FIG. 27)
Figure 29B:
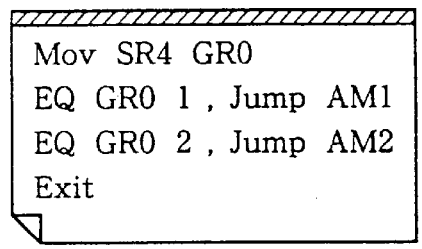
Figure 29C:
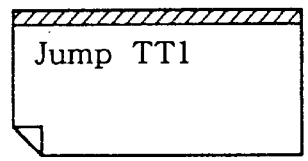
Figure 29D:
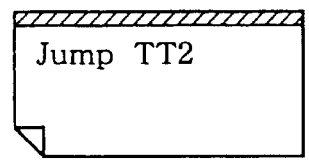

FIGS. 28A and 28B are flowcharts of the reproduction processing derived from the status transition selected by the user.

The microprocessor 310 derives the processing contents of the reproduction processing for realizing the reproduction regions "Title selection" and "Audio selection" respectively shown in FIGS. 28A and 28B based on the status transition selected in accordance with the operation of the user.

FIGS. 29A to 29D are views of the command units (navigation commands) generated based on the selected status transition (FIG. 27).

The microprocessor 310 establishes correspondence between the contents of the reproduction processings of the derived flowchart and the command units shown in FIG. 25 and FIG. 26 when selecting the status transition shown in FIGS. 28A and 28B, generates the navigation commands for realizing the status transition selected by the user for the reproduction regions "Title selection" and "Audio selection" as shown in FIGS. 29A to 29D, and further adds the sub-picture data of the required menu screen to generates the reproduction control data.

Note that, in FIG. 29, the term "next stage" indicates the POST_CMD, and "previous stage" indicates PRE_CMD shown in FIG. 4.

As explained above, according to the method of preparation of navigation commands according to the present invention shown in the second embodiment, the user can input the flow of the processing of the reproduction region and between reproduction regions as he envisions to prepare the navigation commands.

Further, according to the method of preparation of navigation commands according to the present invention shown in the second embodiment, the work efficiency of the user can be improved and the working time can be shortened.

Further, according to the method of preparation of navigation commands according to the present invention, the user can edit the multi-title multi-audio software as required in specifications even if he does not have a complete grasp of the detailed operation and specifications of the DVD player and in addition will not be allowed to cause contradiction in the navigation commands necessary for the reproduction of this multi-title multi-audio software.

Note that the method of preparation of navigation commands shown in the second embodiment is comprised so as to find all command units which can exist and then establish correspondence to the designated status transitions, but it is possible to modify the same so as to find the command units to only designated status transitions after the designation of the required status transitions.

Further, it is possible to modify the method of preparation of navigation commands shown in the second embodiment so as to be able to display the GUI screens similar to those shown in FIG. 9 to FIG. 13 in the first embodiment and allow the user to designate the data in a dialog form.

Further, the method of preparation of navigation commands shown in the second embodiment does not have to be realized in the DVD recording apparatus 1 shown in FIG. 5 etc. and can be realized in also for example a single PC.

Further, the operation and specifications of the DVD player shown in the second embodiment are examples. By making suitable changes, the method of preparation of navigation commands of the present invention can be applied to DVD players of other operations and specifications or a recording apparatus using another recording medium (MO disc, HD, etc.).

Third Embodiment

Below, a third embodiment of the present invention will be explained by referring to FIG. 5, FIG. 6, FIG. 30, and FIG. 31.

In many cases, the audio and/or video data of special reproduction of the DVD video disc standard contain the sub-picture units for a plurality of menu screens, while the audio and/or video data of movies etc. contain the sub-picture units for a large number of subtitles or menus.

The sub-picture data comprises sub-picture units containing pixel data quantized to the quadrary values and variable length coded by the sub-picture encoder 2 (FIG. 5 and FIG. 6) for every sub-picture and commands designating the display time, position, and color of the sub-picture (SP display control command of the DVD video disc standard (hereinafter, referred to as a display control command)).

When the coding of part of the continuous sub-picture units is done again, there is a possibility that the length of the data will change and so it is necessary to carry out the plurality of processing for connecting the sub-pictures again.

Accordingly, for example, if sub-picture units for a plurality of subtitle screens are generated by the sub-picture encoder 2 and immediately connected (multiplexed) in the order of the display time, when a change occurs in the menu, subtitle, etc., it is difficult to re-encode only part of sub-picture units.

The method of generation of video data according to the present invention shown as the third embodiment facilitates the addition of sub-picture units, change of the display time, position, and color accompanying a change of specification, etc. by improving the operation of the sub-picture encoder 2 of the DVD recording apparatus 1 shown in the first embodiment so that the generated sub-pictures are not connected immediately after the generation, but are once stored in an intermediate file and connected after completing all changes with respect to the sub-picture units.

Operation of constituent parts of sub-picture encoder 2 in third embodiment

Below, an explanation will be made of the operation of the constituent parts of the sub-picture encoder 2 in the third embodiment.

A/D conversion circuit 204

The A/D conversion circuit 204 of the sub-picture encoder 2 converts the luminance signal of the video data of an analog format input from an external device to a digital format similar to that in the first embodiment and outputs the result to the input terminal b of the selector circuit 206.

Selector circuit 206

The selector circuit 206 selects either of the luminance signal of the video data of the digital format input from the VTR apparatus or computer (not illustrated) connected to the external device to the input terminal a and the luminance signal of the video data input from the A/D conversion circuit 204 to the input terminal b and outputs the same to the quantization circuit 208 similar to that in the first embodiment.

Quantization circuit 208

The quantization circuit 208 quantizes the video data input from the selector circuit 206 to the quadrary values by a predetermined quantization value similar to that in the first embodiment and outputs the quantization result to the variable length coding circuit 220.

Variable length coding circuit 220

The variable length coding circuit 220 variable length-encodes the quantization result input from the quantization circuit 208 by run-length coding etc. similar to that in the first embodiment and outputs the same as the sub-picture data to the control portion 24 and the decoding circuit 222.

Control portion 24

Figure 30:
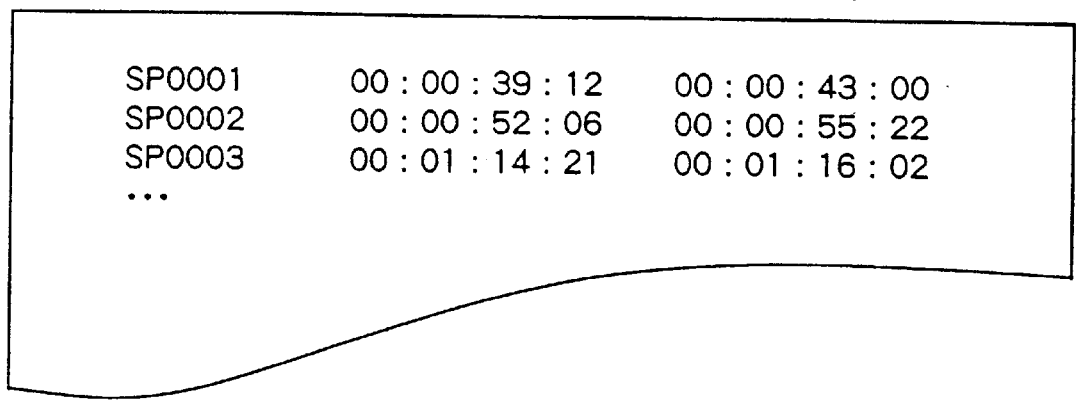
FIG. 30 is a view of an example of the configuration of an intermediate file recorded in a hard disc drive (FIG. 8) of a sub-picture encoder (FIG. 5) in a third embodiment.

FIG. 30 is a view of an example of the configuration of the indication data indicating the intermediate file recorded in the hard disc drive 240 of the sub-picture encoder 2 in the third embodiment.

The control portion 24 controls the operation of the constituent parts of the sub-pioture encoder 2 based on the indication data etc. input from the operation terminal 200 similar to that in the first embodiment and, at the same time, as will be explained below, carries out the improved processing different from that in the first embodiment to generate the sub-picture unit and output the same to the multiplexing portion 106.

Further, the control portion 24 attaches a file name to each of the sub-picture data input from the variable length coding circuit 220 to prepare the intermediate files, records the same in the hard disc drive 240, and further establishes correspondence between the file names and display times (display start time (Start Time) and display ending time (End Time)) of the sub-picture data contained in the intermediate files in the form of a table to generate the indication data shown in FIG. 30.

Further, the control portion 24 adds the display control commands etc. to each of the buffered intermediate files according to the indication of the user via the operation terminal 200 at the point of time when re-encoding accompanied with a change of the contents of the subtitle or the change of the specification of the menu screen is terminated, generates the sub-picture unit, and outputs the same to the multiplexing portion 106.

Decoding circuit 222

The decoding circuit 222 carries out the decoding from the sub-picture data of the quadrary values to the 8 bits of video data similar to that in the first embodiment to generate the video data corresponding to the quantization result of the quantization circuit 208 and outputs the same to the adder circuit 224.

Adder circuit 224

The adder circuit 224 adds the quantization result input from the decoding circuit 222 and the background video data (background) similar to that in the first embodiment, displays the same on the monitor device of the operation terminal 200, and provides this for the purpose of the confirmation of the user.

Operation of sub-picture encoder 2 in third embodiment

Below, the operation of the sub-picture encoder 2 in the third embodiment will be explained by further referring to FIG. 31.

Figure 31:
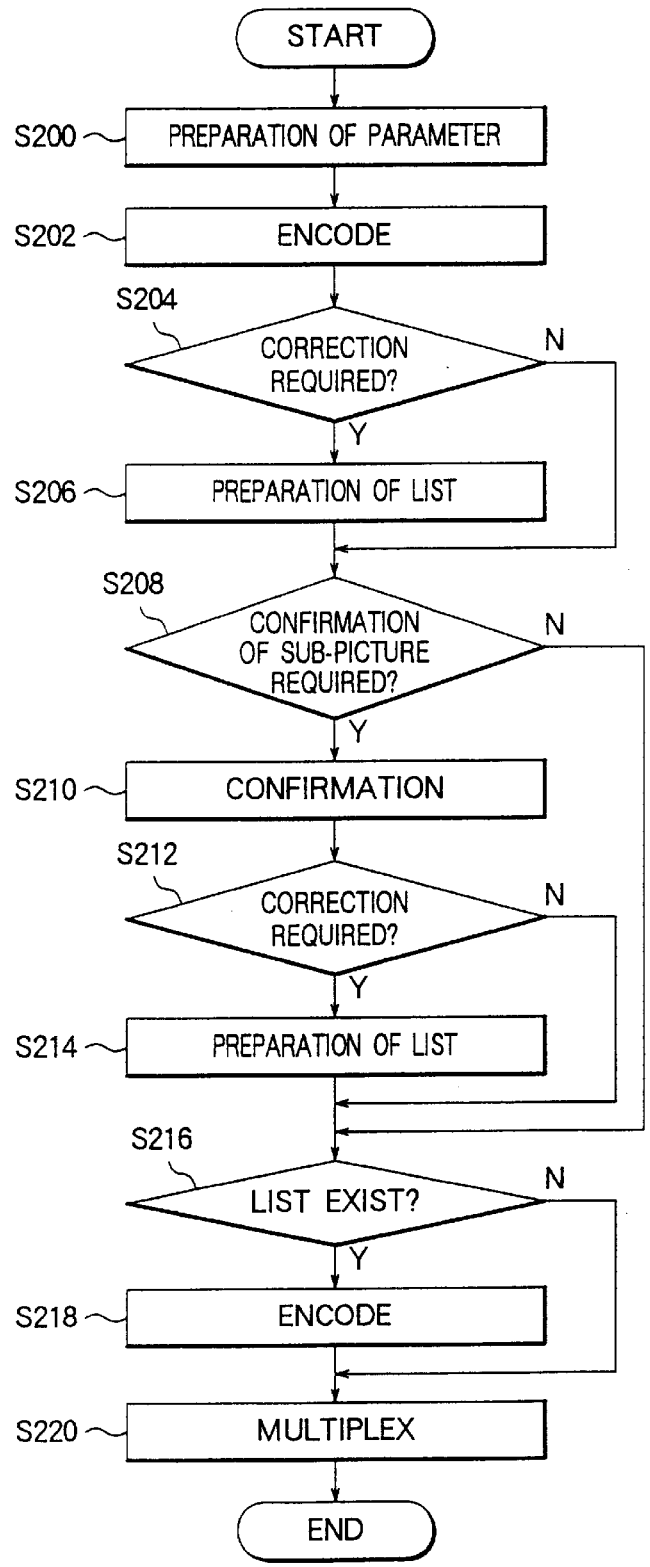
FIG. 31 is a flowchart of an example of the entire operation of the sub-picture encoder in the third embodiment.

FIG. 31 is a flowchart of the example of the overall operation of the sub-picture encoder 2 in the third embodiment.

As shown in FIG. 31, at step 200 (S200), the sub-picture encoder 2 quantizes the input video-data to encode this and displays the same on the monitor device of the operation terminal 200. The user operates the operation terminal 200 according to need while confirming the video of the sub-picture displayed on the monitor device and determines the parameters for designating the change of the quantization value of the quantization circuit 208 of the sub-picture encoder 2 and display color etc.

At step 202 (S202), the user sets the determined parameters in the sub-picture encoder 2. The quantization circuit 208 and the variable length coding circuit 220 of the sub-picture encoder 2 carry out the quantization and coding processing (encoding) of the stock video data by using the set parameters, generates the sub-picture data, and outputs the same to the control portion 24.

At step 204 (S204), the control portion 24 adds a file name to each of the sub-picture data input from the variable length coding circuit 220 as shown in FIG. 30 to prepare the intermediate files, establishes correspondence with the file names of the sub-picture data, display start time, and display ending time and generates the indication data, records these data in the hard disc drive 240, and further displays the video of the sub-picture on the monitor device of the operation terminal 200. The user confirms the video of the sub-picture displayed on the monitor screen of the operation terminal 200, operates the operation terminal 200, and makes the control portion 24 proceed to the processing of S206 which there is a necessity of correction while makes the control portion 24 proceed to the processing of S208 where there is no necessity of correction.

At step 206 (S206), the control portion 24 prepares a list indicating all of the intermediate files of the sub-picture data for which the user decided that there was a necessity of correction by referring to the table of the file names and the display times shown in FIG. 30.

At step 208 (S208), the user ending the generation of the required sub-picture decides whether or not there is a necessity for confirming the sub-picture, operates the operation terminal 200 to make the control portion 24 proceed to the processing of S210 when there is a necessity of confirmation, while makes the control portion 24 proceed to the processing of S216 when there is no necessity of amendment.

At step 210 (S210), the control portion 24 reproduces the sub-picture data recorded in the hard disc drive, decodes this, and displays the same on the monitor device of the operation terminal 200. The user confirms the video displayed on the monitor device of the operation terminal 200.

At step 212 (S212), the user decides whether or not there is a problem in the confirmed video and operates the operation terminal 200 to make the control portion 24 proceed to the processing of S214 when there is a problem, while makes the control portion 24 proceed to the processing of S216 when there is no necessity of correction.

At step 214 (S214), the control portion 24 prepares a list indicating all of the intermediate files of the sub-picture data for which the user decided that there was a necessity of correction by referring to the table of the file names and the display times shown in FIG. 30.

Note that, the decision processing of S206 is for checking the points noted during the encoding, while the decision processing of S214 is necessary for detailed checking after the encoding.

At step 216 (S216), the control portion 24 decides whether or not a list prepared by the processings of S206 and S214 exists. Where the list exists, the control portion 24 proceeds to the processing of S218, while where the list does not exist, the control portion 24 proceeds to the processing of S220.

At step 218 (S218), the user operates the operation terminal 200 to change the quantization value and parameters such as the display position or the display color of the sub-picture again. The control portion 24 carries out the coding (encoding) by using the re-set parameters, generates the sub-picture data, and stores the same in the corresponding intermediate files.

At step 220 (S220), when the changing processing with respect to the sub-picture data of all intermediate files is terminated, the control portion 24 adds the display control command to the intermediate files and generates the sub-picture data and further connects the generated sub-picture units (different from the multiplexing pre-treatment; the processing of MUX106 of FIG. 5) and outputs the same to the multiplexing portion 106.

As described above, according to the method of generation of video data of the sub-picture encoder 2 shown as the third embodiment, intermediate files are formed before connecting (multiplexing) a plurality of sub-pictures and the change of the display position etc. can be carried out with respect to the sub-picture data contained in each of these intermediate files, therefore corrections can be easily made to any parts of the sub-pictures.

As the sub-pictures of the subtitles of movie etc., since very many sub-pictures become necessary, the method of preparation of video data of the sub-picture encoder 2 shown as the third embodiment is particularly effective in the preparation of the sub-picture data of movies etc.

Accordingly, wasted work where the coding of all sub-picture data is done again whenever there is a change with respect to part of the sub-pictures can be eliminated. Further, correspondence is established between the indication data indicating the reproduction time and the intermediate files, therefore the part for which the change of the sub-picture data is required can be quickly found without retrieving all of the sub-picture data.

Note that the configuration of the data indicating the intermediate file shown in FIG. 30 and the sub-picture generation processing of the sub-picture encoder 2 are examples. Any change can be made so far as the same function and performances can be realized.

Further, the method of generation of video data shown as the third embodiment can be applied to not only the preparation of the sub-pictures, but also general still pictures.

As explained above, according to the reproduction control data generating apparatus according to the present invention and the method of the same, a general editor not skilled in programming work can easily carry out the programming of the order, timing, etc. of reproduction of the audio and/or video data by the navigation commands used in the special reproduction mode of the DVD player.

Further, according to the reproduction control data generating apparatus according to the present invention and the method of the same, the preparation of the sub-picture used in the special reproduction mode of the DVD player can be made easy.

Further, according to the reproduction control data generating apparatus according to the present invention and the method of the same, the trouble and time required for the preparation of the large number of sub-pictures having respectively different display contents can be greatly reduced.

What is claimed is:

1. A reproduction control data generating apparatus for generating reproduction control data indicating a method of reproduction of audio and/or video data, comprising:

an audio and/or video data dividing means for dividing said audio and/or video data into reproduction units which serve as units of reproduction;

a status transition extracting means for extracting a status transition among said divided reproduction units;

a status transition selecting means for selecting a desired status transition from among said extracted status transitions; and a reproduction control data generating means for generating reproduction control data based on said selected status transition.

2. A reproduction control data generating apparatus as set forth in claim 1, wherein;

said audio and/or video data dividing means groups said divided reproduction units into reproduction groups for every attribute, and said status transition extracting means extracts said status transition between said divided reproduction units and said grouped reproduction groups.

3. A reproduction control data generating apparatus as set forth in claim 2, wherein said reproduction control data generating means comprises a control command generating means for generating a control command corresponding to the status transition processing for producing said extracted status transition and a control command selecting means for selecting a control command corresponding to said selected status transition and generates reproduction control data containing said selected control command.

4. A reproduction control data generating method for generating reproduction control data indicating a method of reproduction of audio and/or video data, comprising the steps of:

dividing said audio and/or video data into reproduction units which serve as units of the reproduction;

extracting a status transition among said divided reproduction units;

selecting a desired status transition from among said extracted status transitions; and generating reproduction control data based on said selected status transition.

5. A reproduction control data generating method as set forth in claim 4, wherein;

said divided reproduction units are grouped into reproduction groups according to attribute, and the status transitions between said divided reproduction units and said grouped reproduction groups are extracted.

6. A reproduction control data generating method as set forth in claim 5, wherein;

the control commands corresponding to the status transition processing for producing said extracted status transition are generated, the control commands corresponding to said selected status transition are selected, and the reproduction control data containing said selected control commands is generated.

* * * * *

UNITED STATES PATENT AND TRADEMARK OFFICE
CERTIFICATE OF CORRECTION

| | | |
|---|---|---|
| PATENT NO. | : 6,246,402 B1 | Page 1 of 1 |
| DATED | : June 12, 2001 | |
| INVENTOR(S) | : Setogawa et al. | |

It is certified that error appears in the above-identified patent and that said Letters Patent is hereby corrected as shown below:

Title page,
Item [30], Foreign Application Priority Data:

Nov. 7, 1996   (JP) ……………….   8-295206

Signed and Sealed this

Twenty-seventh Day of November, 2001

Attest:

*Attesting Officer*

NICHOLAS P. GODICI
*Acting Director of the United States Patent and Trademark Office*